(12) United States Patent
Benedict

(10) Patent No.: US 7,706,642 B2
(45) Date of Patent: Apr. 27, 2010

(54) METHODS AND DEVICES FOR MOVING OPTICAL BEAMS

(75) Inventor: George Benedict, Fremont, CA (US)

(73) Assignee: Beneficial Photonics, Inc., Fremont, CA (US)

( * ) Notice: Subject to any disclaimer, the term of this patent is extended or adjusted under 35 U.S.C. 154(b) by 27 days.

(21) Appl. No.: 11/198,837

(22) Filed: Aug. 5, 2005

(65) Prior Publication Data

US 2007/0031081 A1    Feb. 8, 2007

(51) Int. Cl.
G02B 6/26    (2006.01)
G02B 6/42    (2006.01)

(52) U.S. Cl. .............................. 385/16; 385/15; 385/12; 385/13; 250/234; 250/227.11; 358/484

(58) Field of Classification Search ................ 250/234, 250/227.11; 258/484; 356/72–73, 301, 318; 385/12–13, 16, 25–26, 31, 88–89, 92
See application file for complete search history.

(56) References Cited

U.S. PATENT DOCUMENTS

| | | | |
|---|---|---|---|
| 3,389,950 A | 6/1968 | Harper | 350/96 |
| 4,520,570 A | 6/1985 | Bednorz et al. | 33/180 R |
| 5,103,497 A | 4/1992 | Hicks | 385/117 |
| 5,212,376 A * | 5/1993 | Liang | 250/208.1 |
| 5,375,033 A | 12/1994 | MacDonald | 361/281 |
| 5,394,500 A | 2/1995 | Marchman | 385/123 |
| 5,590,457 A | 1/1997 | Ninchi | 29/721 |
| 5,726,073 A | 3/1998 | Zhang et al. | 437/228 |
| 5,727,098 A | 3/1998 | Jacobson | 385/31 |
| 5,808,472 A | 9/1998 | Hayes | 324/671 |
| 6,046,720 A | 4/2000 | Melville et al. | 345/108 |
| 6,076,397 A | 6/2000 | Binnig et al. | 73/105 |
| 6,091,067 A | 7/2000 | Drobot et al. | 250/234 |
| 6,134,955 A | 10/2000 | Han et al. | 73/105 |
| 6,157,863 A | 12/2000 | Chandler et al. | 700/56 |
| 6,161,035 A | 12/2000 | Furusawa | 600/476 |
| 6,294,775 B1 | 9/2001 | Seibel et al. | 250/208.1 |
| 6,501,210 B1 | 12/2002 | Ueno | 310/331 |
| 6,550,918 B1 | 4/2003 | Agostinelli et al. | 353/7 |
| 6,749,346 B1 | 6/2004 | Dickensheets et al. | 385/88 |
| 6,785,437 B2 * | 8/2004 | Hagood et al. | 385/16 |
| 6,845,190 B1 | 1/2005 | Smithwick et al. | 385/25 |
| 2002/0064341 A1 | 5/2002 | Fauver et al. | 385/25 |
| 2003/0076604 A1 * | 4/2003 | Hagood et al. | 359/822 |
| 2003/0179428 A1 | 9/2003 | Suzuki et al. | 359/204 |
| 2004/0042716 A1 * | 3/2004 | Dames | 385/31 |
| 2004/0178975 A1 | 9/2004 | Benedict | 345/84 |
| 2005/0018264 A1 | 1/2005 | Benedict | 359/196 |
| 2005/0029439 A1 | 2/2005 | Benedict | 250/234 |

\* cited by examiner

*Primary Examiner*—Frank G Font
*Assistant Examiner*—Erin D Chiem
(74) *Attorney, Agent, or Firm*—Schneck & Schneck; David M. Schneck

(57) ABSTRACT

A method and device for moving optical beams including a conduit and an attached, independently movable structure that moves the conduit with up to 6 degrees of freedom both controlled and restricted as required. This structure may include a conductor positioned by an electromagnetic field generator. A cam or flexible capacitor plate or combination of such could also form the independently moveable structures. A control provides a current through the conductor, thereby providing a force on the conductor to move the conduit. A position sensor detects the position of the conduit and provides feedback to the control to aid in accurate and rapid movement.

43 Claims, 37 Drawing Sheets

METHODS AND DEVICES FOR MOVING OPTICAL BEAMS

TECHNICAL FIELD

The present invention relates in general to methods and devices for moving light beams and more specifically to methods and devices for moving light beams that pass through a flexible optical conduit.

BACKGROUND

Moving optical beams is required for a number of different applications, including scanning devices, imaging devices, illumination devices, optical switching devices, and optical analytical devices among others. In a number of prior such devices this movement of the optical beams has been effected by moving a flexible optical fiber.

For example one device and method for movement of an optical fiber is disclosed in U.S. Pat. No. 5,727,098. This reference discloses a scanning optical fiber system in which the fiber is fixed at a first end, and may flex at a second end. At this second end a magnetic material is positioned. A plurality of electromagnets are arranged to produce a variable magnetic field that interacts with the magnets to deflect the optical fiber in a predetermined scanning pattern. In addition, a feedback device detects the position of the fiber and provides information on the deflection of the second end of the fiber to achieve the required scan patterns. The feedback device may be a hall effect detector, a proximity sensor, a strain gauge that actuates a transducer, a magnetic impedance detector, or similar device.

A second device for moving an optical fiber is disclosed in U.S. Pat. No. 6,845,190 in which a resonating optical conduit (for example a cantilevered light guide) is used with a specialized control. The controller induces a phase signal source that produces a reference signal and a phase control coupled to a sensor to receive a position signal and a reference signal. An amplitude controller is also used that includes an amplitude reference source and an amplitude control coupled to a sensor to receive a position signal. The resulting output from the phase control and the amplitude control are combined to control the drive of the resonating optical conduit. These controllers can utilize both open loop and closed loop controllers.

Another alternative for moving an optical fiber is to create a "bimorph", a physically elongate fiber including an optical fiber joined to an expandable/contractible structure to form a single fiber. For example, U.S. Pat. No. 6,091,067 discloses a cantilever-mounted optical fiber within a micro electro-mechanical motor. The fiber is flanked by two piezoelectric elements to form a unitary structure, a bimorph. The piezoelectric elements may be excited to cause the structure to rapidly bend, producing a line scan. U.S. Pat. Nos. 4,520,570; 6,501,210 and others also disclose variations of the bimorph technology.

U.S. Pat. No. 6,046,720 discloses another alternative device in which an optical fiber is scanned, such as in a raster pattern. In this reference a resonant cantilever, driven by an electromagnetic drive circuit or piezoelectric drive, moves the fiber.

U.S. Patent App. No. 2002/0064341 discloses a scanning optical conduit that has a first fixed end and a second, tapering end. The tapered end may include a "hinge", i.e., a location where the diameter of the fiber narrows, to enhance movement. A mechanical vibratory resonator at the tip of the conduit may move in a one or two-dimensional scan pattern at a selected amplitude and frequency. A microlens may be affixed to the top of the optical fiber.

U.S. Pat. No. 5,808,472 discloses a device and method of positioning an optical fiber and determining the position of the optical fiber. A capacitance member on the free end of the optical fiber responds to a generated electric field.

These prior art references all provide various tools for moving an optical fiber to produce a scan of a beam of light. However, accurate and rapid movement of the beam has proved elusive for a variety of reasons. First, an optical fiber section has a characteristic frequency at which the fiber will seek to move. Moving the optical fiber at other frequencies has proved challenging. Second, the scanning provided in the prior art references generally is done along a single axis. In references in which the scanning is along two axes, it is difficult to move the fiber in a manner in which the fiber moves along just a single axis first, then the second axis.

There are six degrees of freedom associated with the unique determination of the position of the end of a conduit. This includes three translational degrees of freedom (x,y,z axis) and three rotational degrees of freedom (yaw, pitch and roll). Active conduit control of three or more degrees of freedom has not been reported to date.

In order to move the conduit it is typically required to induce the desired motion in a number, L, of degrees of freedom, while restricting the motion in a number, M, of degrees of freedom where M plus L equals 6. Active restriction of undesired degrees of freedom of motion has not been reported to date.

Another consideration in the precise sub-micron movements of structures is the interaction between the operator of a sub-micron differential micrometer and the structure. The act of touching the micrometer deforms the structure more than a sub-micron level adjustment. In practice, however, a skilled operator can compensate somewhat for these difficulties.

In a number of commercially available mechanical structures a latching mechanism is provided as a separate adjustment from the micrometer. For example this may be a screw that may be tightened up against the micrometer to prevent the micrometer from inadvertent turning. However, typically latching the micrometer disturbs the structures' position. Again a skilled operator can compensate somewhat for these difficulties.

Regarding the sub-micron level performance of flexure based structures the latch does not prevent what is known as creep or the slow deformation of the entire structure that may be caused by the loading forces required to bend the flexure structure.

SUMMARY

In a first group of embodiments of the optical beam moving device a conduit is attached to a means for moving the conduit, such as a flexible elongate conductor or a flexible elongate capacitor. A position sensor senses the position of a movable portion of the conduit. A control, using at least in part the signal from the position sensor, controls the means for positioning the conduit. This control can include a stiffness control, an accuracy of motion control, or a conduit dampening control. The means for moving the conduit may move the conduit as a translation, a rotation or some other movement. This configuration may be designed to allow movement in between two and six degrees of freedom and restrict movement in between four and zero degrees of freedom. These movements may be provided by a number of different means for moving the conduit, including the combination of cams and elongate flexible conductors. The means for moving the conduit also may include a plurality of conductors.

In a second group of embodiments, the device for moving an optical beam includes a conduit, an independently movable conductor joined to the conduit, and a magnetic field generator. A controller regulates the current flowing through the conductor. The induced magnetic field produced by the current interacts with the magnetic field produced by the magnetic field generator producing a force that moves the conduit. A position sensor including a beam source, a beam sensor at which the beam is directed, and a shutter affixed to the conduit that modulates the amount of the beam that reaches the sensor as the conduit moves combine to allow determination of the conduit position. The information from the position sensor is used by the controller at least in part to regulate the current flowing to the conductor. The conduit may be an optical fiber. In some implementations either the conduit or the conductor or both may have variable stiffness in different directions of flexure. In one example, the conductor or conduit may have an asymmetric cross sectional shape. The conductor may be comprised of two separate conductors in perpendicular orientation thereby forming a quadrupole loop shape. In some embodiments the electromagnetic field generator may be an electromagnet, a capacitor, or a permanent magnet. A number of elements may be attached to a fixed wall, including the conduit, the conductor, and the required beam sensors. The controller may be a servo controller. The device may also include a latch that contacts and controllably restricts the motion of the conduit.

In another alternative group of embodiments, the device for moving a light beam includes a light source producing a light beam that is focused into a conduit. A conductor is attached to the conduit and is independently movable for a portion of its length from said conduit. Both the conduit and the conductor are held on a rigid mount such that a free end of the conduit may be moved by the conductor. An electromagnetic field generator produces an electromagnetic field that interacts with an induced magnetic field produced by current flowing through the conductor. This provides the motive force for moving the conduit. A control regulates the current flow, and at least in part in response to information from the position sensor. The position sensor may be a beam source, a beam detector and a shutter attached to the conduit, as described in the above embodiment groups. This position sensor may also include a reference detector as a secondary detector that detects a portion of a position sensor beam that is not modulated. This may be used to normalize the position sensor beam output. The control may be a servo control. The servo control may include an amplifier that produces a proportional voltage, a integrator that produces an integrated voltage, and/or a differentiator that produces a differential voltage. The conduit may move over a hemispherical surface at the focus of a lens, such as a lens including a Petzval image surface.

In another group of embodiments, the device for moving a light beam includes a first conduit and a mount for fixing one location of the conduit. Attached to the conduit is a first conduit moving component that may be a cam, an independently movable conductor or an independently movable capacitor. The conduit moving component is also attached to a mount. A position sensor of the device senses the position of a moving part of the conduit. A control regulates the conduit moving component, at least partially in response to the signal from the position sensor. In this group of embodiments, additional conduits, conduit moving components and position sensors may be added to the system. Alternatively, a single conduit may have several conduit moving components attached at various positions along the length of the conduit.

If multiple elongate conductors are used as the conduit moving component, these may have parallel or perpendicular orientations. The system may include a z-axis positioning device, such a cam. The conduit may be configured with slack to allow for z-axis positioning. To restrict movement in one or more degrees of freedom, either a conduit or a conductor may have an asymmetric cross section. As in other embodiment groups, the control may be a servo device. In multiple conduit configurations, a single conduit moving device may be used to move multiple conduits.

In another group of system embodiments, a conduit is mounted on a mount and attached to a plurality of conduit moving means at different locations on the conduit. A position sensor senses the movement of the conduit at each of these locations. A control then regulates each conduit moving means at least in part from the signal of each position sensor.

In another group of embodiments, the system for moving light includes a plurality of conduit moving modules, each module include a conduit, a conduit moving means, a position sensor, and a control which regulates the conduit moving means at least in part in response to a signal from the position sensor. These conduits could share controls. A buss could control movement of the conduits such that subgroups of the conduits may be moved in coordination.

In another group of embodiments, a method of moving light includes introducing light into a conduit at a fixed end and moving the end of the conduit such that this end moves in N degrees of freedom but is restricted in M degrees of freedom, where N plus M equals six. This method could include an initial step of focusing along the z-axis of the moving end of the conduit. The shape of the conduit may be used to restrict the end of the conduit. The movement could also be restricted by a physical latch. A servo controller may be used to control the movement of the conduit, as by controlling apparent stiffness, integrating voltage, or using a damping means. The servo may be a digital servo controller.

In another group of embodiments, a method of moving light may include introducing a light beam into a conduit that is mounted at a fixed location and has a movable end, and moving the end such that light directed from the moving end is targeted into the center location of an optical element as the movable end moves. This may require moving the end in both a translation and a rotation, as well as restricting movement in at least one degree of freedom. This method may also include an initial step of z-axis focusing, and may include focusing a conduit which has slack. Moving the conduit may utilize a servo controller. The conduit movement may result in part from a predetermined set of voltages. The applied light beam may be applied by a light transducer. The optical element may include a Petzval imaging surface, a hemispherical imaging surface, or a planar imaging surface.

DETAILED DESCRIPTION

Figure 1A:
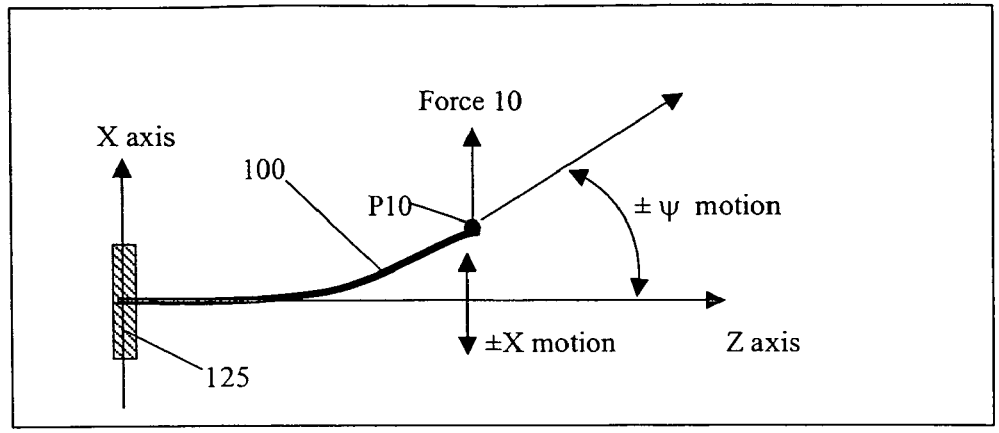
FIG. 1a is a side view of a conduit and fixed mount illustrating transverse degrees of freedom motion for the conduit.

For the purpose of the present disclosure, the following term meanings are adopted.

Herein, "optical beams", and "light", refer not only to electromagnetic waves in the visible spectrum but also to ultraviolet and infrared light.

Herein the acts of scanning, moving, bending, and positioning are all referred to as the act of moving.

Herein a "conduit" refers to an optical conduit. Typical examples of optical conduits would be optical fibers comprising core and cladding design, or light guides and light pipes comprising a rod design. Optical conduits are typically made from glass, fused silica, or plastic. A conduit is a flexible, elongate structure capable of transmitting an optical beam. Recently photonic crystal fiber structures utilizing the principal of guiding light beams with hollow capillary structures have been disclosed as a form of flexible optical conduit.

Herein, optical conduits are used to move light beams. Generally the conduits have one location attached to a rigid structure. If the attachment location is a proximal end of the conduit, this may facilitate coupling light into or out of the conduit through this proximal face. The second end (the distal end) may move in up to six degrees of freedom. Light may also be coupled into or out of the face at the distal end of the conduit (e.g., to adapt this end to light collection).

It is generally known that movable structures (such as the conduit) should be made with minimal mass. Using plastic, for example, for the conduit material instead of glass can improve the driver efficiency and the temporal response of the required conduit movement.

Herein a "conductor" is referred to as an electrical conductor. Typical examples of electrical conductors are wires or ribbons formed from extruded or pressed ductile metals such as copper, aluminum, or beryllium. An electrical conductor is a flexible, elongate structure capable of carrying an electrical current. In the presence of a magnetic field a force is exerted on the conductor proportional to the current flow in the conductor. See for example Halliday and Resnick, Physics, 1967, pages 819 and 820.

In some embodiments the magnetic field or fields are produced by one or more permanent magnets.

A conductor (e.g., an elongate flexible conductor) may have an elongate flexible insulator surrounding it to prevent the current in the conductor from inadvertently leaving the conductor.

In some embodiments the conductor may be in the form of a loop with more than one turn. The adjacent loops are insulated from each other. In the presence of a magnetic field the force exerted on the conductor is also substantially proportional to the number of loops.

It is generally known that moving parts such as the conductors, and where necessary the insulators, should be made with minimal mass. Making the conductor out of a lighter weight material such as aluminum or beryllium instead of copper can improve both the driver efficiency and temporal response of the required conductor movement.

Herein the term "stiffness" is used to describe the ratio of an applied force, F, to a flexible and elongate structure and the resultant motion, $\xi$, of the structure due to that force. In the mathematical treatment of stiffness, herein, the letter, k, is used to represent a stiffness value. The stiffness value for a structure, where $k=F/\xi$, may vary in the direction of the applied force. As will be described in the servo section, the servo controller using feedback from position sensors giving information about the time dependence, $\xi(t)$, may essentially electronically modify a stiffness value k for the structure. An increased stiffness value may be desirable for mechanical structures that need to respond quickly to driving forces.

It is well known that the displacement (and hence also the stiffness) of a servo-controlled device can be altered electronically (see for example the "Handbook Of Military Infrared Technology" published in 1965, Chapter 17. Control Systems, pages 661 to 728).

Herein the term "damping" refers to a velocity dependent effect on the motion of the conduit and the associated conductor moving in a medium, usually air, which has a value, $\beta$, herein. The first time derivative of the position $\xi$ (t), as determined by the position detector, (this time derivative is proportional to the velocity and hence proportional to the damping effect) can be used by the servo controller to increase the damping effect. The increased damping, during for example a step change in position, is useful because it can reduce the overshoot error of the step type motion.

It is well known that the damping effect of a servo controlled device can be altered electronically (see for example the "Handbook Of Military Infrared Technology" published in 1965, Chapter 17. Control Systems, pages 661 to 728).

The applicant has adopted the term "Quadruflexure™" to refer to these new conduit moving devices and "Quadruflex", to refer to this new technology for moving conduits.

Generally, the conductor is in the form of a flexible quadrupole that can be driven by a power supply with currents flowing in two loops. In some illustrated embodiments, a single loop conductor is used.

The conductor, fixed to the wall and carrying a current from a current source, is positioned in an electromagnetic field generated by a field generator. Since the field generator is in a fixed position, this interaction exerts electromagnetic forces on the conductor, that together with the reaction forces of the fixed wall, serve to bend or otherwise change the shape of the conductor. The conduit that is attached to both the conductor and to the wall is thereby bent or otherwise forced to move from its original position. The amount of and direction of the current flowing through the conductor can adjust the amount of and direction of the movement.

It is also possible to maintain a constant current in the conductor and to vary the electromagnetic field generated by the field generator. Controlling the field generator power supply can produce similar forces and motions of the conductor as described above.

As in other devices disclosed in the prior art, a position sensor aids in the regulation of the movement of the conduit. In one embodiment the position sensor measures not the light emitted from the conduit, but the position of the conduit itself at a location typically near the distal end of the conduit. In alternative embodiments a position sensor may use light emitted from the conduit to measure the position of the conduit. One or more sensors can determine the actual positions of the conduit. It is desirable for the sensors to unambiguously determine these positions without being affected either by other positions of the conduit or by the conductor actuators or by the detector sensors. This positioning information is conveyed to a control device that regulates current to the conductor. In this manner a servo control device or other feedback control may be used to compare the actual positions with the desired positions and then to make appropriate corrections to minimize the differences thereby controlling the accuracy of the movement of the conduit.

The face of the conduit, at the distal end of the conduit, has 6 degrees of freedom where motions are to be induced in L degrees of freedom and to be restricted in M degrees of freedom, where M plus L equals 6.

In one embodiment the means to determine the conduit position information is with a portion of the position sensor referred to as the shutter that can be attached to the conduit. The L degrees of freedom require that one or more shutters provide the L number of position values to L number of position sensors, although fewer than L number of shutters may be used. The interaction between the one or more shutters and the position sensors is described for a number of conduit moving embodiments. Alternatively, other position sensors could be used.

Eight cases are presented where embodiments are described that produce a variety of movements in flexible, elongate conduits resulting from forces applied to the conduits by conductors. The conduit at one location and the conductors at two locations are fixed to rigid walls.

The location of where the conduit and conductors are attached to a rigid mount (e.g., a wall) may be near the ends of a conductor and the proximal end of the conduit. This may be preferred for the conduit to provide a fixed location into which light is directed, or out of which light is directed. Mirrors, fibers, or other optical elements could be used to couple the light into or out of the conduit. Alternatively, a conduit or conductor could be fixed at a mount at a location, and extend from this location. The conduit may be fixed at a location on a mount and extend from this location to a coupler which may typically be selectively attached to a light source or a detector or other such fiber coupled optical device. Similarly the conductor may extend from one or both mounted (fixed) locations, which may be convenient to connect the conductor to a power supply or controller.

Various embodiments may be stacked. One quadruflexure fixed to its stationary rigid mount (e.g., wall), may effectively carry the rigid mount structure, the conductors and conduits, and the detectors for a second moving conduit. For example, a first optical system may comprise a number of conduits, conductors, cams, position sensors, etc. all attached to and providing movement for a second system. In addition (or alternatively) the optical system may serve as a mount for components that have already been mounted to a rigid structure. In this manner some components (such as the light source and detection for some types of position sensors) may be made as stand alone components and "stacked" on as a component of another system.

Servo controller electronics circuits are described which take the sensor determined positions, and compares them with the desired positions. These servo circuits provide driving signals back to the quadruflexure to optimize the desired movements. The servo is a method of maintaining the position of a conduit. It is particularly useful for maintaining the position of a conduit when there is creep in a mechanical flexure device.

Another method to maintain the position of the conduit, beneficial in the event electrical power is removed or is limited, is described by various latching techniques. Embodiments may utilize embodiments of one dimensional to six dimensional latches.

Array embodiments have several advantageous properties such that 1) they may move several conduits cooperatively, 2) they may be configured in planar arrays, and 3) they may utilize a bussed and latched array structure.

Conduits:

As shown in FIG. 1a, a flexible, elongate, conduit 100, is held fixed near one end by a rigid wall 125. The transverse motion resulting from Force 10, substantially in the X direction and applied at point P10, on the conduit 100, combined with the reaction force due to wall 125, moves conduit 100, in both a tilt +ψ about the Y axis and a translation in the +X direction.

It is well known that the transverse deflection of the distal end of conduit 100, δx, is approximately given by:

$$\delta x = \frac{FL^3}{3EI},$$

where F is an applied force similar to Force 10 above, L is the length of the conduit, E is Young's Modulus, and I is the moment of inertia about the cross section of the conduit. From the "strength of materials" section of Machinery's Handbook, 21$^{st}$ Edition, 1979, page 408.

Knowing both δx and L, the tilt angle is then approximately determined from ψ=δx/L. Typically other values of displacements and rotations can be calculated or estimated from similar formulas given in the above reference.

Figure 1B:
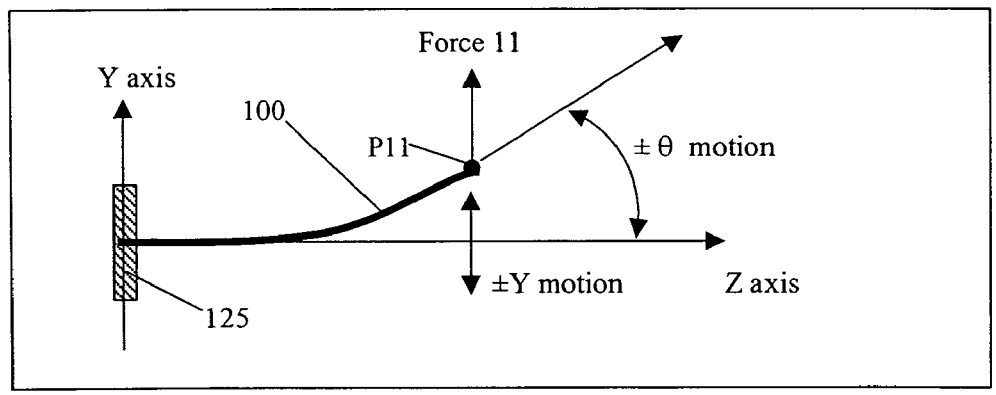
FIG. 1b is a top view of a conduit and fixed mount illustrating transverse degrees of freedom motion for the conduit.

As shown in FIG. 1*b*, the flexible, elongate, conduit 100, is held fixed at one end by a rigid wall 125. The transverse motion resulting from Force 11, substantially in the Y direction and applied at point P11, on the conduit 100, combined with the reaction force due to wall 125, generates both a translation in the +Y direction and a tilt ±θ about the X axis.

Figure 1C:
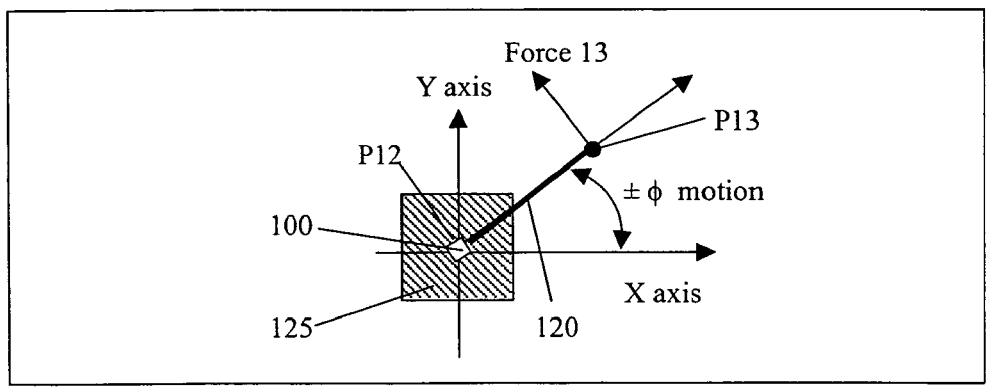
FIG. 1c is a front view of a conduit and fixed mount illustrating the axial degree of freedom for a fixed flexible conduit.

As shown in FIG. 1*c*, a torque is applied to the conduit 100, at point P12, by Force 13 applied to a moment arm 120, at point P13. Typically this moment arm 120 will be part of a conductor. In combination with the reaction forces from wall 125, a torque is applied to the conduit 100, that results in an axial rotation of the conduit 100 about the Z axis of ±Φ.

Figure 2A:
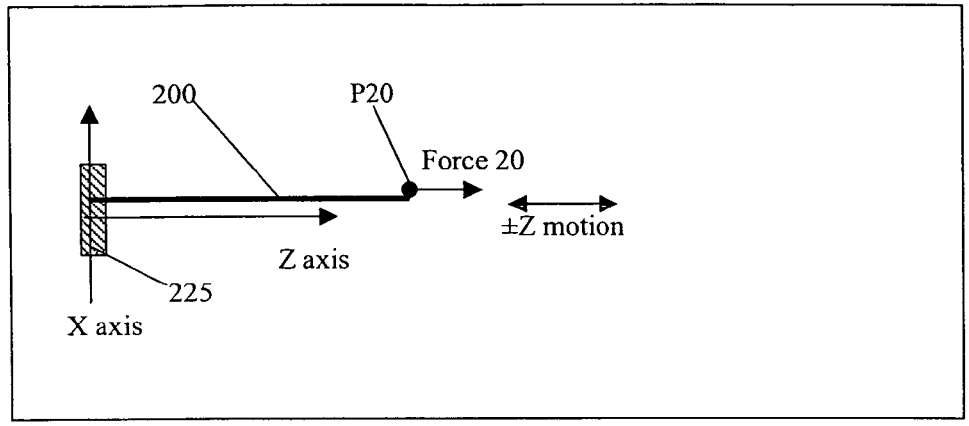
FIGS. 2a and 2b are side views of a conduit and a mount showing Z-axis motion of a fixed flexible elongate conduit.

A conduit may be axially translated as shown in FIG. 2*a*, by applying an axial elongation Force 20, to conduit 200, at point P20. Conduit 200 is also fixed to the rigid wall 225. A relatively large Force 20 is required to produce a relatively small translation in +Z.

Figure 2B:
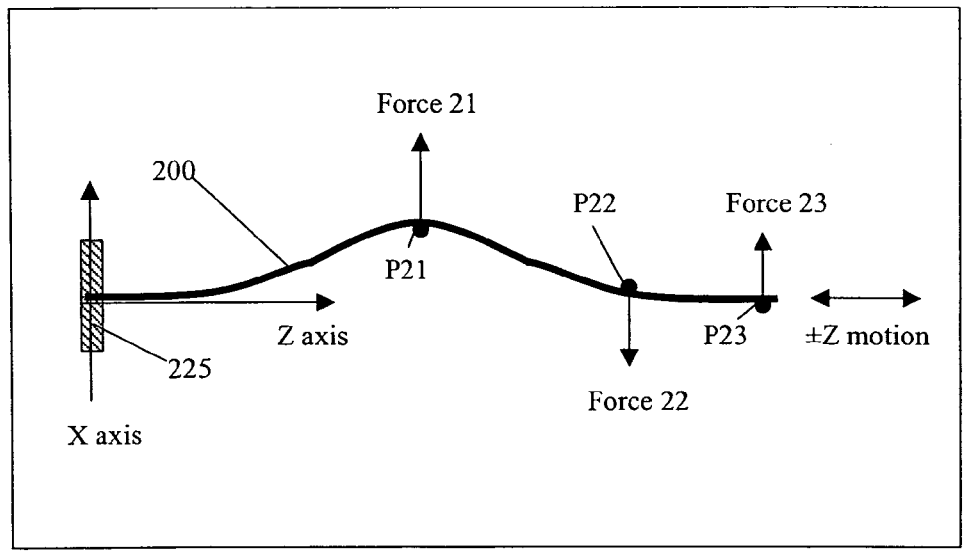

The conduit 200, shown in FIG. 2*b*, can be thought of as two slack sections: from the rigid wall 225, to point P21, and from P21 to P22. Force 21, Force 22, and Force 23 act on conduit 200 at points P21, P22, and P23 as shown. A more efficient elongation of conduit 200, in the −Z direction results from this bending action as compared with the axial force described in FIG. 2*a*. However, generally this still is not an efficient means of producing the elongate translation because the forces act against each other and not in the direction of the desired motion.

Figure 2C:
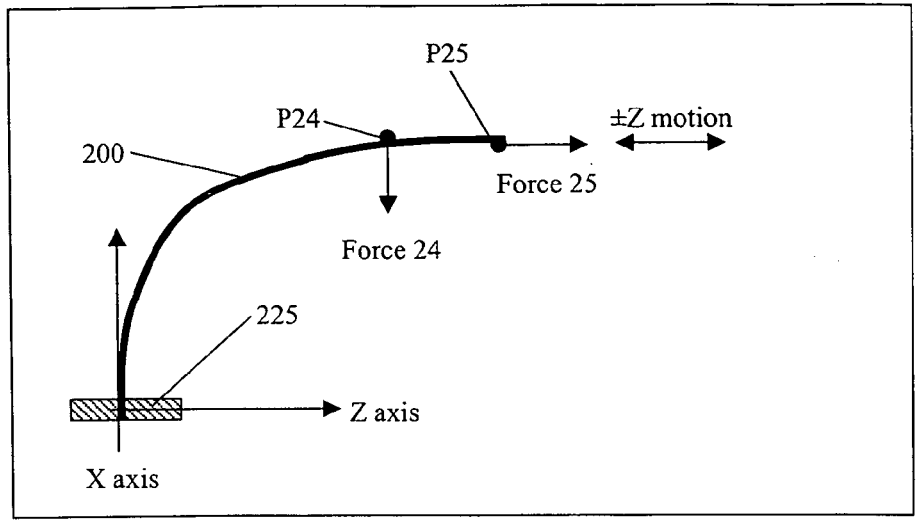
FIG. 2c shows a side view of an alternate embodiment for the elongation of a fixed flexible elongate conduit.

FIG. 2*c*, remedies this by using Force 24, applied to the conduit 200, at point P24, to bend the conduit by about 90° or more. Other angles greater than 90° will also accomplish the same benefit although at the expense of more space. As an alternative or in addition to, Force 24 a pre-stress (i.e., a shaping) in the fabrication of the conduit 200 can be used to create the bend in conduit 200. As shown, Force 25 applied to the conduit 200 near point P25 both has the advantage of being in the direction of the desired motion and as being relatively small. As compared with Forces 21, 22, and 23 in FIG. 2*b*, the Force 25, in this embodiment produces a more efficient ±Z translation in this case.

Figure 2D:
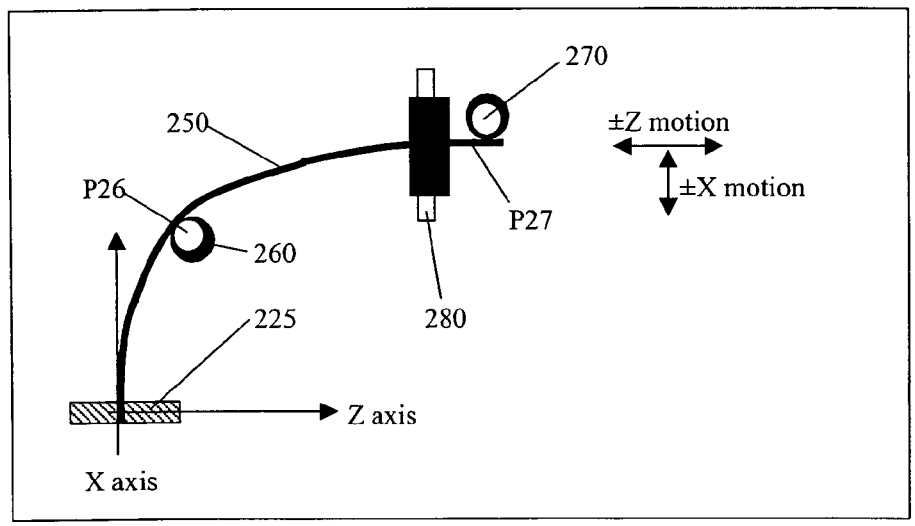
FIG. 2d is the side view of an embodiment showing added elements for movement in three degrees of freedom.

The configuration in FIG. 2*d* is useful for moving a conduit 250 in 3 degrees of freedom with simple mechanical forces and bearing surfaces. Shown are cams 260, 270, and 280 each comprising a shaft and an off-center bearing surface fixed to the shaft. Rotating cam 260 pushes the conduit 250 near point P26, resulting in a ±Z axis motion of the conduit 250. Non-rotating cams 270 and 280 provide two bearing surfaces to guide the conduit 250 during the Z translation and maintain the X and Y positions. Similarly rotating cam 270 pushes the conduit 250 near point P27 in the ±X direction. Non-rotating cams 260 and 280 provide two bearing surfaces to guide conduit 250 during the X translation and maintain the Y and Z positions. Likewise rotating cam 280 pushes conduit 250 near point P27 in the ±Y direction. Non-rotating cams 260 and 270, provide two bearing surfaces to guide conduit 250 during the Y translation, and maintain the X and Z positions.

Figure 2E:
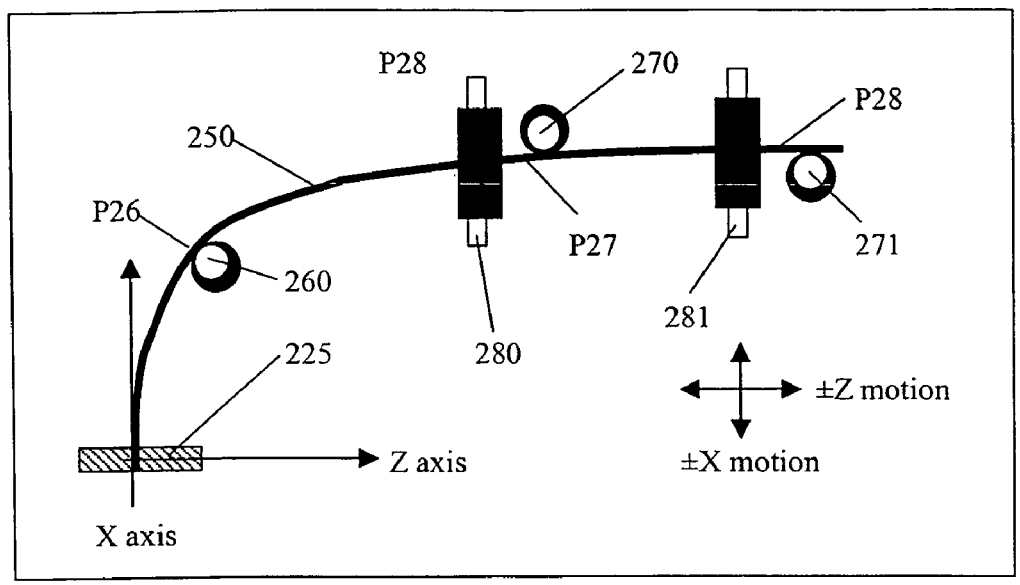
FIG. 2e is a side view of an embodiment with additional cams included to allow for control of five degrees of freedom of conduit movement.

FIG. 2*e* is similar to FIG. 2*d* with the addition of cams 271 and 281. The conduit 250 may be moved in 5 degrees of freedom. Cam 271 works with cam 270 to provide both ±ψ motion and independent ±X motion of conduit 250. Cam 281 works with cam 280 to provide both ±θ motion and independent ±Y motion of conduit 250. Cam 260 provides Z axis movement.

Similar mechanical adjustment and bearing systems using various types of screws, motorized stages, piezo translators, and micrometers for moving conduit 250 in 6 degrees of freedom may be realized using off-the-shelf components. However, typically these off-the-shelf components are complex and massive (in comparison to a simple conductor in a magnetic field) and may not be efficient for producing fast motions and may not be cost effective and in addition may not be space effective.

Figure 3A:
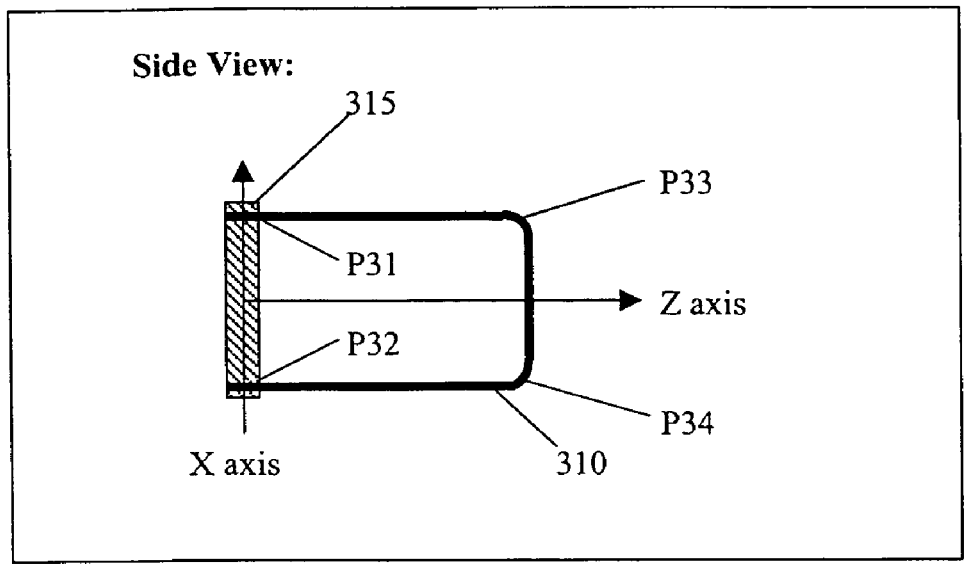
FIGS. 3a and 3b show a side view of a fixed end flexible elongate conductor.
Figure 3B:
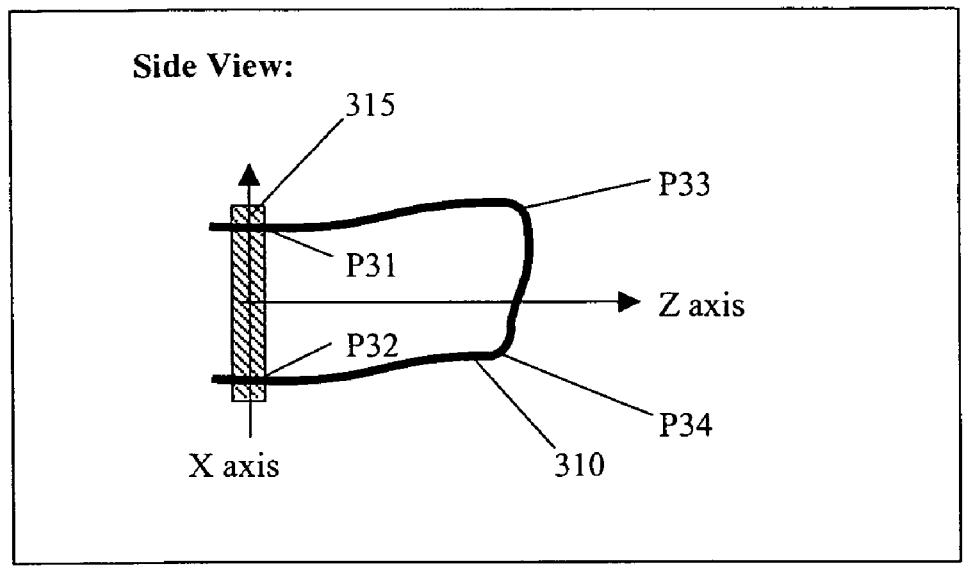

Conductors:

FIGS. 3*a* and 3*b* illustrate the nature of the conductor 310, bending and changing its shape due to forces acting on it. For example in one embodiment these forces may be applied by piezo translators. In another embodiment the forces are due to currents flowing in the conductors in the vicinity of a magnetic field.

Figure 3C:
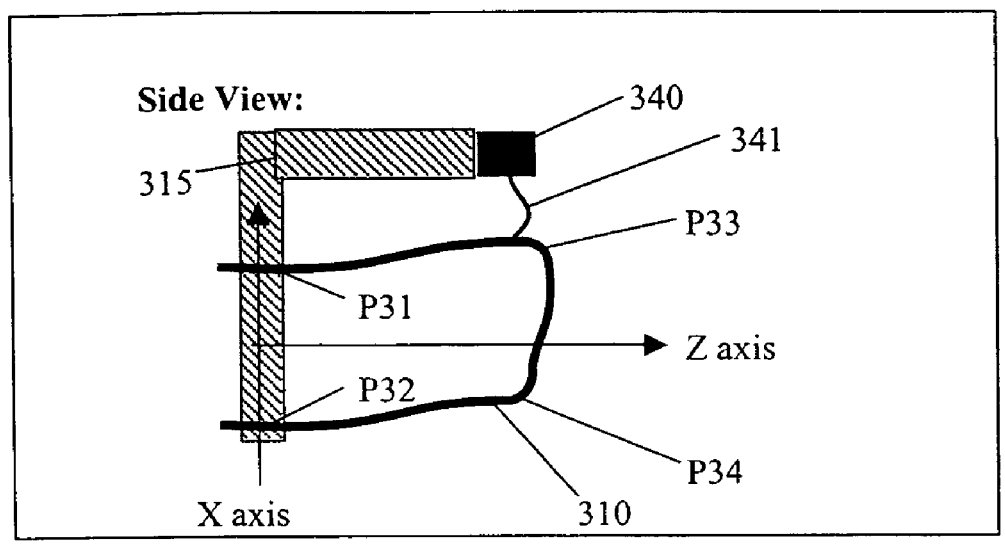
FIG. 3c shows a side view of a fixed end flexible elongate conduit with a force coupling member.

In an embodiment illustrated with FIG. 3*c*, piezo translator 340, attached to rigid wall 315, is used to generate a bending force on a force coupling member 341. The force coupling member may be a flexible wire shaped element similar to a conductor that need not carry an electric current in this case. The force coupling member 341, serves to bend or otherwise change its shape in transferring the force to the conduit. Typically the piezo element 340, is stiff and brittle and may fracture if bending forces are directly applied to it. Hence the flexible force coupling member 341, improves the piezo performance and reliability.

While the motion of the force coupling member 341, is shown in the ±X direction in FIG. 3*c*, it could also be used to apply ±Y direction force and motion to the conduit in another embodiment also using conductor 310. Thereby allowing the current in the conductor 310, to control the ±X motion and the piezo electric current (or voltage typically) to control the ±Y motion independently.

The conductor 310, referred to in FIGS. 3*a*, 3*b*, and 3*c*, is assumed here to have a round, a square, or an otherwise symmetrical cross section so that the inherent stiffness is substantially the same in the transverse directions of the conductor 310. The conductor 310, is rigidly held at the wall 315, at points P31 and P32. The conductor 310, carries a current and is in the proximity of a magnetic field substantially in the Y axis direction, out of the page, and not shown.

The portions of the conductor 310, between P31 and P33, as well as the portions of the conductor 310, between points P32 and P34, tend to bend or otherwise move in the X axis direction as shown in FIG. 3*b*. This movement is a result of both the magnetic forces and the rigid wall 315 reaction forces.

The portion of the conductor 310, between points P33 and P34, tends not to substantially move in the Y direction. The Y direction magnetic forces on conductor 310 segment between points P33 and P34 are offset by the two Y direction reaction wall forces carried by conductor 310, segment P31 to P33, and segment P32 to P34.

However, the portion of the conductor 310, between points P33 and P34 tends to both translate in the X axis direction and rotate in the clockwise manner shown for this deflection (and will rotate counter-clockwise for the opposite X axis translation direction). The motion and change of shape of the conductor 310, between points P33 and P34, is thereby forced by both the motions and shape of conductor 310, segment between P31 and P33, and the segment between P32 and P34.

The conductor 310 is typically fixed to the conduit (not shown) near the midpoint between P33 and P34. Therefore the conduit (not shown) is both translated in the X direction and rotated either clockwise or counter clockwise at the point where it is fixed to the conductor 310.

Both the stiffness of the conduit and the stiffness of the conductor and the geometry of the combined structure allow adjustment of the amounts of and directions of both the translation and the rotation. This two-fold property is still a single degree of freedom, because the two variables, position and angle, are related and are proportional to each other.

Figure 4A:
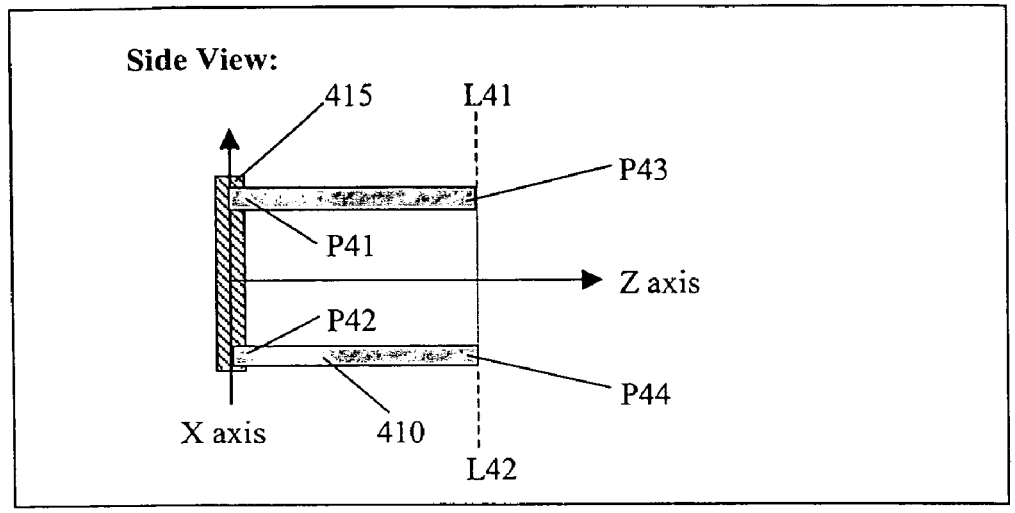
FIGS. 4a and 4b show a side and front view respectively of a fixed end flexible ribbon-type elongate conductor.
Figure 4B:
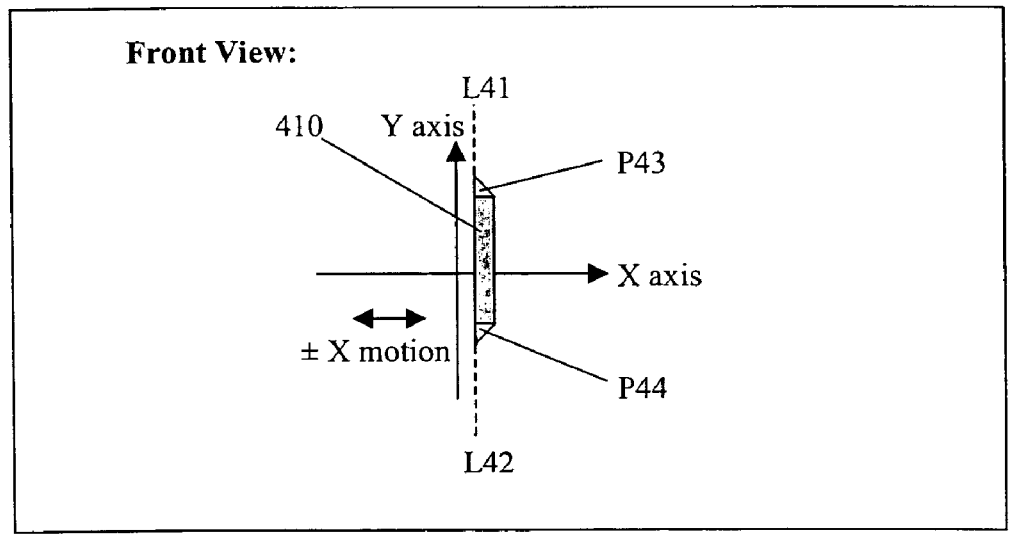

An embodiment of a conductor is shown in FIGS. 4a and 4b. The conductor 410, is a ribbon shape that may be made from a foil, for example aluminum foil.

If the cross-sectional dimensions of the ribbon foil are 100 mills by 1 mill the moment of inertia, I, is given by:

$$I = \frac{bd^3}{12},$$

where b is 100 mills and d is 1 mill and the axis of bending is centered on d and parallel to b. From the "strength of materials" section of Machinery's Handbook, 21$^{st}$ Edition, 1979, page 370.

Therefore, the bending is preferred along this axis of rotation. With a bending axis perpendicular to the above direction, the difference in stiffness (interchange b and d in the calculation) is 10,000 times larger, thereby serving to substantially limit bending in this perpendicular direction. Not every application would require such a great difference in stiffness and various ribbon conductors (i.e., conductors that are cross-sectionally asymmetrical) may be used in various applications. A "ribbon shape" would include any shape in which one cross sectional dimension is at least two times greater than another cross sectional dimension.

The conductor 410 is held at the wall 415 at points P41 and P42. At points P43 and P44 the conductor 410 is both folded over itself to make the characteristic triangle shape of such a 45° fold and again bent at about 90° near lines L41 and L42 to create the three dimensional shape indicated in FIGS. 4a and 4b.

With a current flowing in the conductor 410 in the presence of a magnetic field (not shown) substantially in the Z axis direction, motion of the conductor 410 is induced in the X axis direction.

The ribbon conductor 410 bends relatively easily in the portions between P41 and P43 and between P42 and P44 allowing the desired motion. However, the geometry and stiffness of this structure substantially limit other bending motions.

Figure 5A:
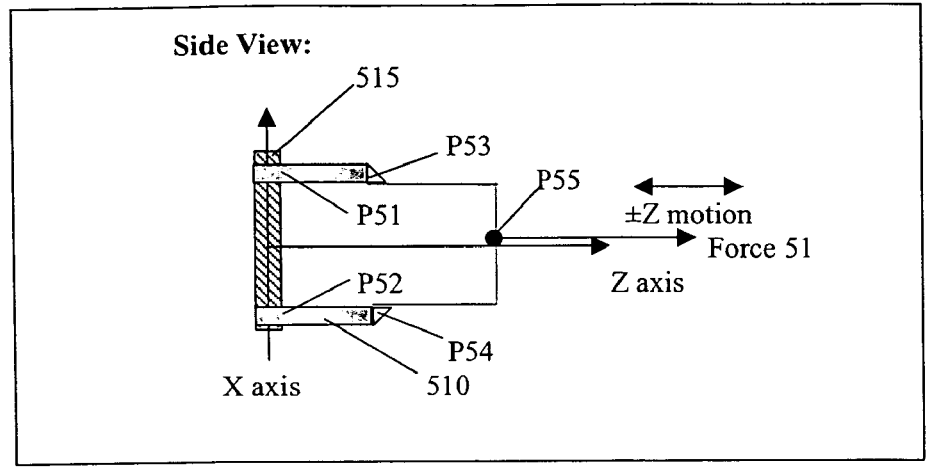
FIGS. 5a and 5b show a side and front view respectively of an alternative embodiment of a fixed and flexible ribbon-type elongate conductor.
Figure 5B:
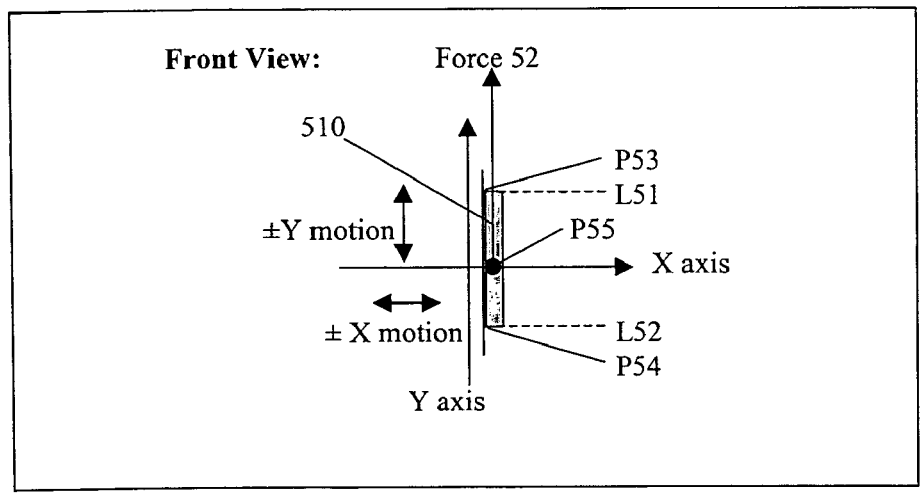

Another alternative embodiment of a conductor is shown in FIGS. 5a and 5b. The conductor 510 is a ribbon shape that may be made from a foil (for example aluminum foil) with about three times less density than copper foil. Because aluminum cannot be soldered to conventional copper wires to complete the electrical circuit to the conductor current source, the joint between the aluminum and copper may be made by pressing the two materials firmly together and/or by using conductive epoxy to glue the two materials together. There are also well known brazing and electrolytic processes for example involving a nickel coating on the aluminum to facilitate the electrical connection between aluminum and copper materials.

The conductor 510 is held at the wall 515 at points P51 and P52. At points P53 and P54, the conductor 510 is folded over itself to make the characteristic triangle shape of such a 45° fold, and again bent at about 90° and then further folded over itself to make another 45° fold (not shown) to create the three dimensional shape indicated in FIGS. 5a and 5b. The conductor 510 is also bent at about 90° at lines L51 and L52, as also shown in FIGS. 5a and 5b.

With a current flowing in the conductor 510 and a magnetic field (not shown) substantially in the Z axis direction, motion of the conductor 510 is induced in the X axis direction.

The ribbon conductor 510 bends relatively easily in the portions between P51 and P53 and between P52 and P54, allowing the ±X axis motion. In addition the conductor 510, bends relatively easily about lines L51 and L52 allowing ±Y axis motion that can be applied by Force 52 applied at point P55. Such a Force 52 can be due to another similar flexible elongate conductor (not shown, but discussed in the next paragraph), attached across conductor 510, near to point P55.

The conductor 510 and the crossed conductor (not shown in FIG. 5b) can each carry separate currents if the attachment point P55 also insulates them. This embodiment of crossed conductors is also shown in both FIGS. 12c and 13c, and discussed in detail further on. This characteristic cross shape of the two conductors is a useful concept as it defines a true quadrupole geometry that is also flexible and elongate.

In respect to FIG. 5a, if a Force 51 in the Z axis direction is applied to the point P55 then the conductor 510 can bend about lines L51 and L52 to also accommodate a ±Z axis motion. Similarly the crossed conductor (not shown) can accommodate the ±Z axis motion.

The ribbon conductor 510 does not bend easily in other directions (those not just described above) due to the increased stiffnesses of the ribbon geometry in these other directions thereby restricting these undesired motions.

Position Sensors:

As indicated above, a positioning sensor allows establishing a feedback loop to control conduit movement. In cases where all but one of the degrees of freedom are fixed, position possibly could be determined using known non-contact electromagnetic field sensors based on either capacitance or inductance designs. For example a metallic shutter attached to the conduit, such as shutter 1040 in FIG. 10a, could be used as one plate of a capacitance sensor. Typically, however in the quadruflexure cases presented herein, these sensors fail to provide an unambiguous signal because rarely can only one degree of freedom be uniquely singled out by motion of the shutter. Differential methods (using two capacitance sensors for example) can be used to help somewhat but at the expense of complexity. Furthermore, even capacitance or inductance based differential methods usually fail when motion is described in cases with three or more degrees of freedom.

Figure 6:
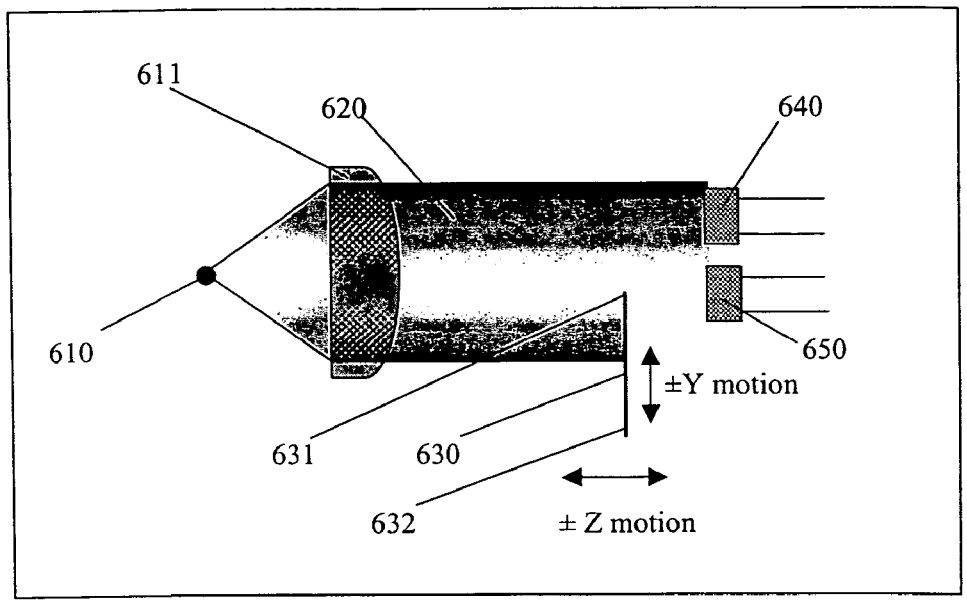
FIG. 6 shows a side cross sectional view of a position detector component.

An alternative embodiment of the conduit positioning sensor that provides a high quality signal for the degree of freedom of interest and is essentially free of interference from the other degrees of freedom is shown in FIG. 6.

In this embodiment of a positioning sensor a substantially point light source 610, emits rays of light 620, collimated by lens 611, and directed to impinge both on reference detector 640, and on signal detector 650. An example of a point light source 610 is a laser diode. Another example of a collimated light source is an LED with an encapsulated plastic lens that combines light source 610 and lens 611 into a single package. This single package is typically referred to as an LED and is commercially available.

A shutter 630 blocks some of the light rays 620 thereby affecting the signal generated by signal detector 650. The shutter 630, is attached to the conduit.

Movement of the conduit (not shown but attached to shutter 630) in the +Y direction moves the conduit in the +Y direction and thus the attached shutter 630 thereby blocks more light at the detector 650. This y direction movement of shutter 630 markedly changes the signal at the signal detector 650 in this example. Movement of the conduit in the ±X direction does not significantly change the signal produced by detector 650. Movement of the conduit in the ±Z direction does not significantly change the signal produced by detector 650. Movement of the conduit producing rotations in the shutter 630 about edge 631 does not significantly change the signal produced by detector 650. Rotations of the conduit producing rotations in the shutter 630 about edge 632 can induce a small change in the signal produced by detector 650. However, typically the conduit design can be implemented in a manner that minimizes the rotations of the conduit corresponding to rotations of the shutter 630, about edge 632.

The reference detector 640 can be used to control the amount of light generated by light source 610 and to normalize the position signal holding it constant in time in the event that the light source 610 varies somewhat in time. The normalization solutions may be mitigated by monitoring and controlling the power supply to the light source using a light source that produces the least variable light, and having the above sensor calibrated on a periodic basis.

A set of sensors, similar to the one shown in FIG. 6, can provide an unambiguous set of high accuracy signals (for example photo-currents) for each desired degree of freedom for the conduit. Typically the photo-current is converted into a voltage by a pre-amplifier for processing by the servo controller.

In an embodiment, a single light beam 620 that is sufficiently broad could be used such that it is able to impinge upon both a side edge and a top or bottom edge of shutter 640. A single reference detector 640 (if included) and two positioning detectors similar to 650, would allow determination of ±X and ±Y movement. It may also be desirable to use separate beams similar to 620, for each detector. These beams could be generated from a single collimated beam similar to 610 and 611, which is split into two beams using a beam splitter (not shown). A single source may simplify normalization.

In one contemplated embodiment a normalized light source simultaneously illuminates the proximal end of a number of sensor-conduits, where the sensor-conduits are formed into a bundle at their distal ends. These sensor-conduits are routed to the position sensors as required. The distal end of each sensor-conduit then serves as a normalized point source 610, for each position sensor.

There are a wide variety of other position sensors and schemes described in the prior art that one skilled in the art could use to determine the required position information for the embodiment cases.

Quadruflexure Cases I through VIII:

The following eight embodiment cases describe various motions of the conduit that provide a desired location and direction of the face at the distal end of the conduit. The location and direction of a light beam, that may either leave the conduit or enter the conduit through this distal face, is thereby defined.

The conductors are fixed to and apply forces to the conduit. One end of the conduit and two ends of the conductors are fixed to rigid walls that also serve to provide reaction forces to the conductors and conduits. Both the conduits and the conductors, and their combinations are flexible, elongate structures.

Figure 7A:
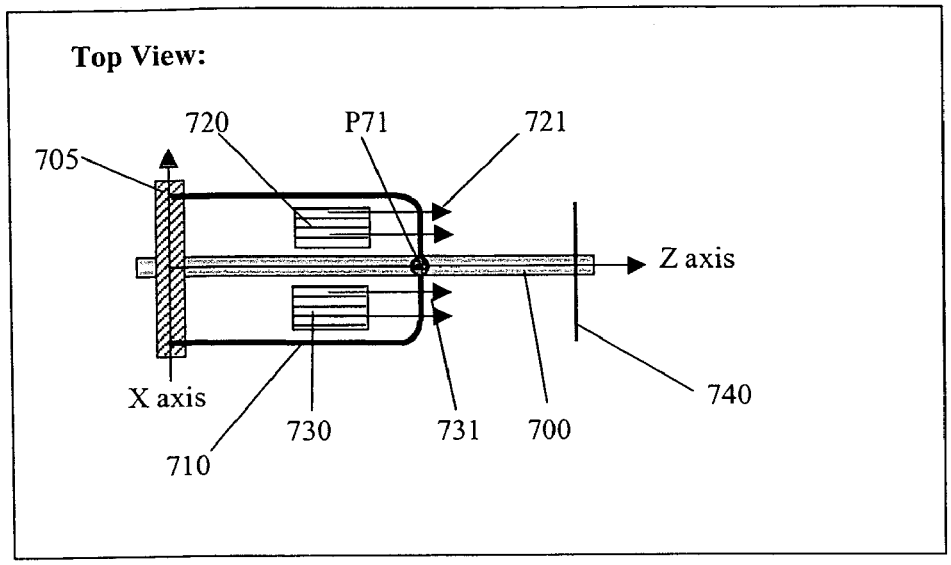
FIGS. 7a and 7b show a top and side view respectively single transverse rotational degree of freedom conduit moving device.
Figure 7B:
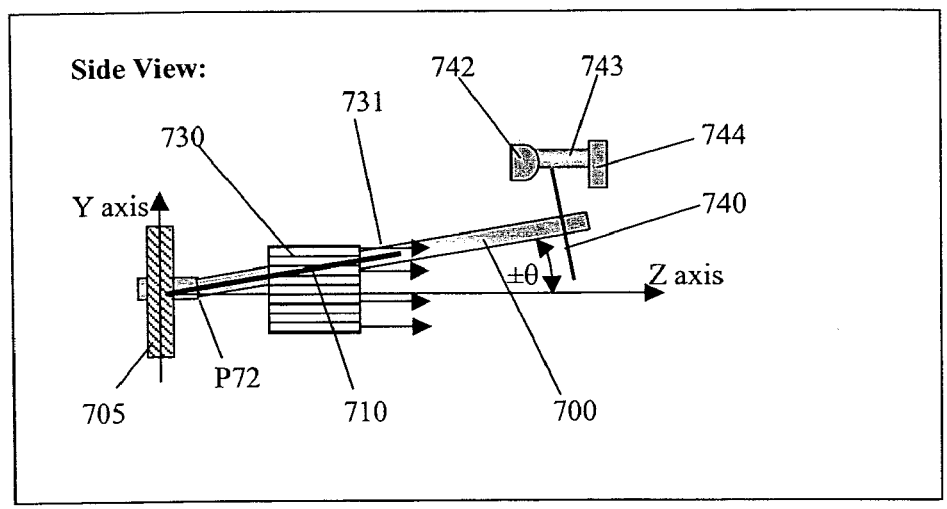

Case I: One Rotational Degree of Freedom and Five Restricted Degrees of Freedom:

In this embodiment shown in FIGS. 7a and 7b, the induced degree of freedom for the light beam at the distal end of the conduit is a desired rotation $\theta$ about the X axis, with the other motions in $\psi$, $\Phi$, X, Y, and Z restricted by the stiffness resulting from the structural geometrical design. This is an identical case to a desired rotation $\psi$ about the Y axis, with the other motions in $\theta$, $\Phi$, X, Y, and Z restricted by the stiffness resulting from the conduit and/or conductor structural geometrical design.

A quadruflexure embodiment is shown in FIGS. 7a and 7b. The quadruflexure consists of a conduit 700 attached to an electrical conductor 710 carrying a current generated by the servo controller (not shown). The rigid wall 705 holds the conduit 700 and conductor 710 at one location on conduit 700 and two locations on conductor 710.

The quadrupole loop is formed by the shape of conductor 710. Rigorously this loop is a dipole not a quadrupole in this case; but it can be thought of as one half of a two-loop quadrupole with the second loop not used.

The magnetic fields 721 and 731, generated by magnets 720 and 730, are substantially in the Z axis direction. Current flowing in the conductor 710 that is substantially in the X axis direction in the vicinity of the magnetic fields 721 and 731, induces a motion in the conductor 710 in the Y axis direction. The conduit 700 is attached to the conductor 710, at point P71. Forces exerted on conduit 700 by the conductor 710 and by the rigid wall 705 in the vicinity of point P72, thereby tend to bend conduit 700, in the Y axis direction generating the desired $\theta$ rotational motion about the X axis.

A shutter 740 is also attached to the conduit 700. Light rays 743 from LED 742 in the Z direction are partially blocked by shutter 740 and detected by detector 744. The signal from detector 744 can provide information on the distance shutter 740, moves in the Y axis direction. The distance the shutter 740 moves in the Y axis direction can be used to determine $\theta$, the amount of rotation about the X axis direction of conduit 700. As before, this and other position sensors were illustrated above.

In addition to the rotation $\theta$ there is a translation in the Y axis direction of the distal end of conduit 700 where the amount of the Y translation is proportional to $\theta$.

Figure 8A:
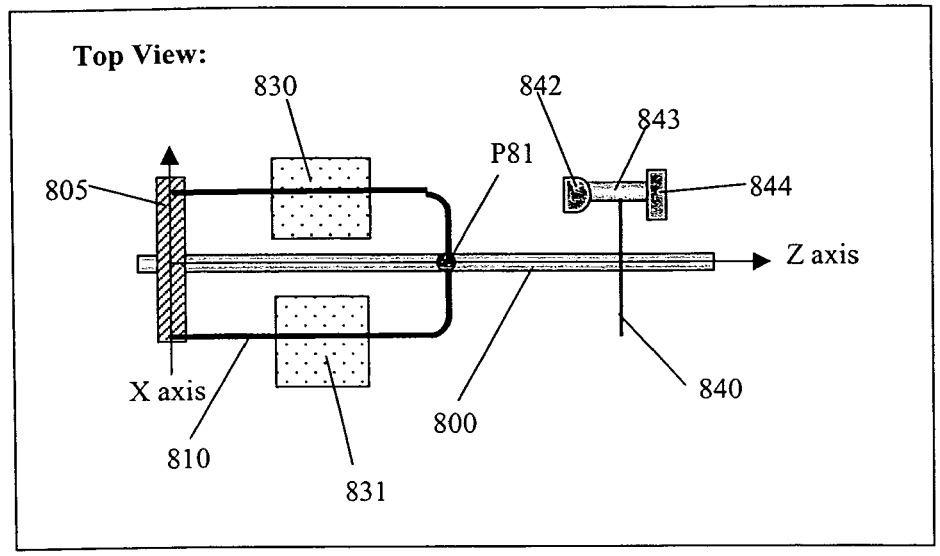
FIG. 8a is a top view of an embodiment of a single transverse rotational degree of freedom conduit moving device.
Figure 8B:
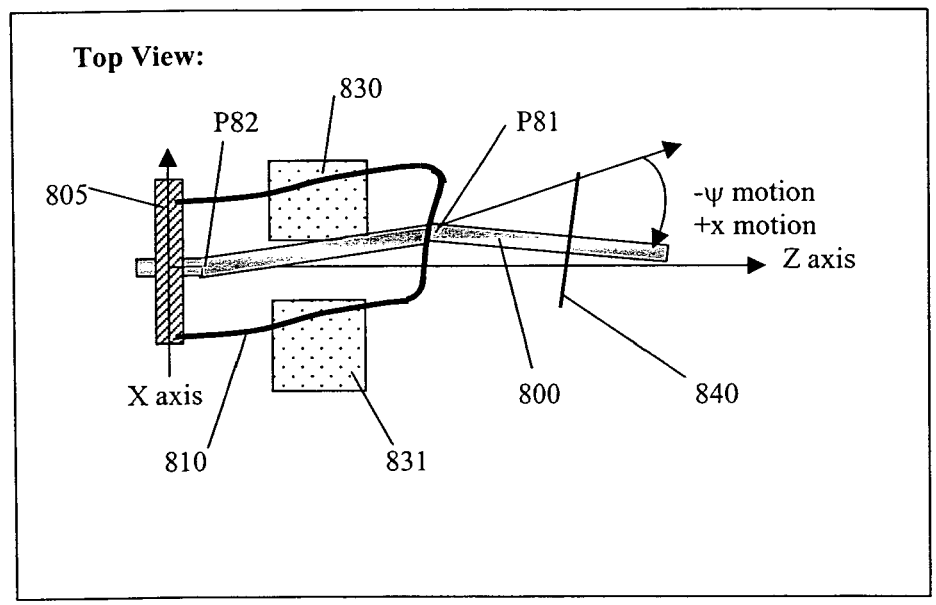
FIG. 8b is the view of FIG. 8a while the conductor element is being moved.

A small variation on the prior embodiment results in predominantly a ±$\Psi$ rotation of the distal end face of the conduit (with a small ±X translation that is proportional to ±$\Psi$). As shown in FIGS. 8a and 8b, the location of the magnets and the direction of the magnetic fields are changed compared to FIGS. 7a and 7b.

The N magnet 830, has a North pole face generating a magnetic field (not shown) in the +Y direction. S Magnet 831 has a South pole face, generating a magnetic field (not shown) in substantially the −Y axis direction. Current flowing in conductor 810 in the vicinity of the magnetic fields generated from magnets 830 and 831, tends to exert forces on conductor 810, in the X axis direction. Combined with the reaction forces on conductor 810 due to the rigid wall 805 the conductor 810 tends to bend or otherwise change shape similar to conductor 310, described above in FIGS. 3*a* and 3*b*.

Bending conduit 800, as shown at point P81 by the conductor 810 and as shown at point P82, due to the reaction force of rigid wall 805 induces conduit 800 to take on the shape shown in FIG. 8*b*. The face of conduit 800 at the distal end has a desired rotational angle $-\Psi$ and displacement in the +X axis direction.

A shutter 840 is also attached to the conduit 800. Light rays 843 from LED 842 in the Z direction are partially blocked by shutter 840 and detected by detector 844. The signal from detector 844 can provide information on the distance the shutter 840 moves in the X axis direction. The distance the shutter 840 moves in the X axis direction can be used to determine the rotation $\pm\Psi$.

The design of both the amount of displacement in the X axis, and the amount of rotation θ about the X axis direction, can be determined from the stiffness values of the conduit 800, and the conductor 810. The two motions are dependent; they comprise only one degree of freedom. This two-fold property is useful for the preferred embodiment of a device for moving a light beam in the imaging lens system described in FIG. 22.

Case II: One Rotational Degree of Freedom and Five Restricted Degrees of Freedom:

In this embodiment the induced degree of freedom of the light beam at the distal end of a conduit is a desired axial rotation Φ about the Z axis, with the other motions in ψ, θ, X, Y, and Z restricted by the stiffness resulting from the device structural geometrical design.

Figure 9A:
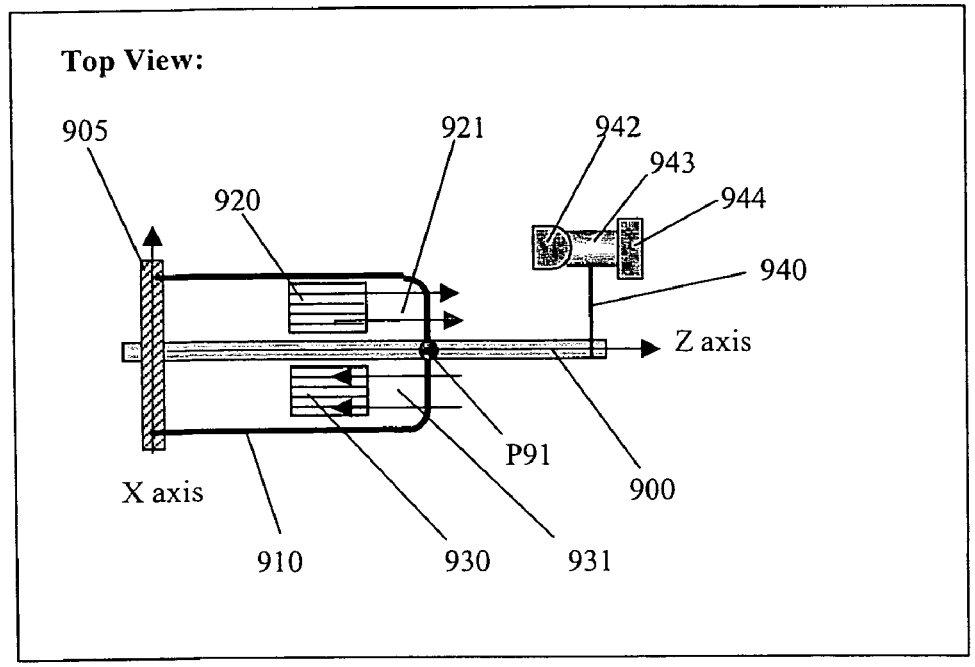
FIGS. 9a and 9b show a top and front view respectively of a single axial rotational degree of freedom conduit moving device.
Figure 9B:
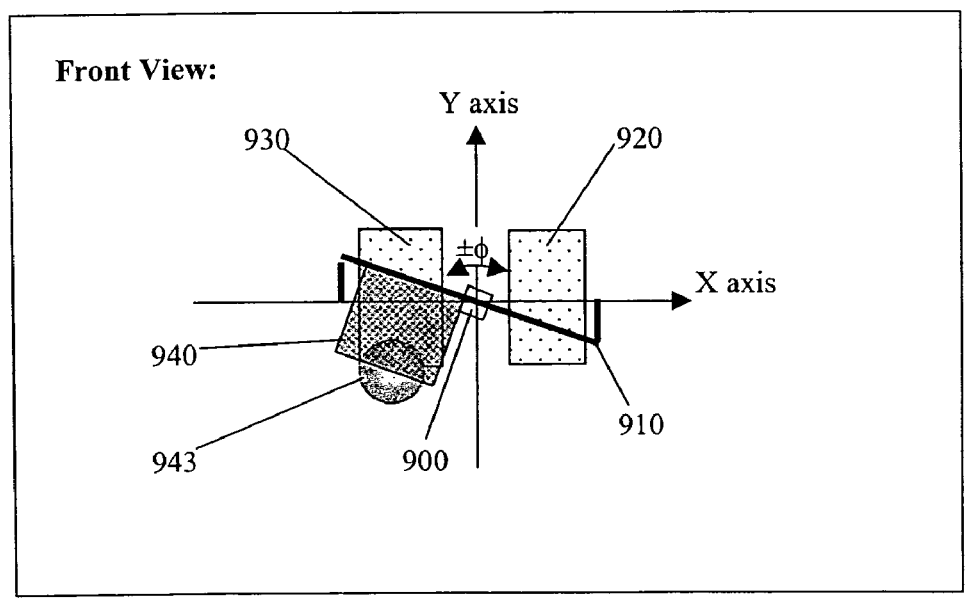

A device embodiment is shown in FIGS. 9*a* and 9*b*. The device consists of a conduit 900, attached to an electrical conductor 910, carrying a current generated by the servo controller not shown. The rigid wall 905, holds the conduit 900 and conductor 910.

The shape of conductor 910, is in the form of a quadrupole loop. Rigorously this loop is a dipole not a quadrupole in this case; but it can be thought of as one half of a two-loop quadrupole with the second loop not used.

Current flows in the conductor 910, that is substantially in the X axis direction in the vicinity of the magnetic fields 921, and 931. Field 921, generated by magnet 920, with a N magnetic pole face, and field 931, generated by magnet 930, with a S magnetic pole face, induces a torque about the Z axis direction, on the conductor 910. The torque is applied by conductor 910, to conduit 900, which is held by the rigid wall 905. This produces a rotation of the distal end of conduit 900 in the $\pm\Phi$ direction.

The amount of axial rotation $\pm\Phi$, is relatively small, however, in some applications such as polarimetry, a small axial rotation may be useful.

A shutter 940 is also attached to the conduit 900. Light rays 943 in the Z direction generated by LED 942, are partially blocked by shutter 940, and detected by detector 944. The detector 944 provides information on the distance the shutter 940 moves relative to the Y axis. The distance the shutter 940 moves relative to the Y axis can be used to determine $\pm\Phi$.

Case III: One Translational Degree of Freedom and Five Restricted Degrees of Freedom:

In this embodiment the induced degree of freedom of the light beam at the distal end of the conduit is a desired translation along the Z axis while the other motions in θ, Φ, ψ, X, and Y are restricted. This is an identical case to a desired translation along the X axis while the other motions in θ, Φ, ψ, Y, and Z are restricted. This is also an identical case to a desired translation along the Y axis while the other motions in θ, Φ, ψ, X, and Z are restricted. Undesired motions are restricted by the stiffness resulting from the conduit and/or conductor structural geometrical design.

Figure 10A:
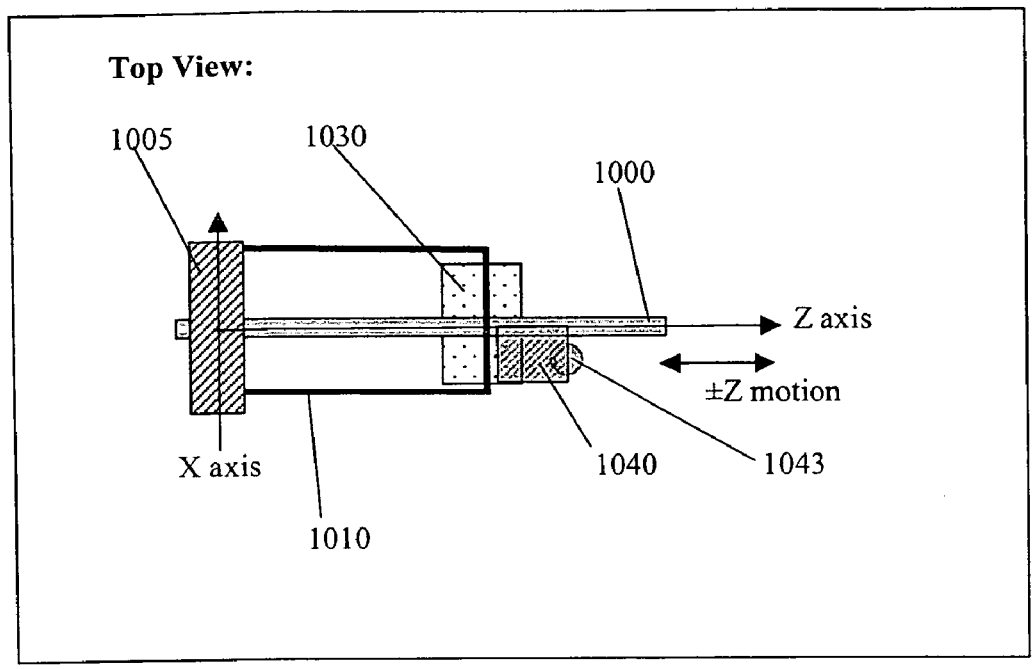
FIGS. 10a and 10b show a top and side view of a single axial translational degree of freedom conduit moving device.
Figure 10B:
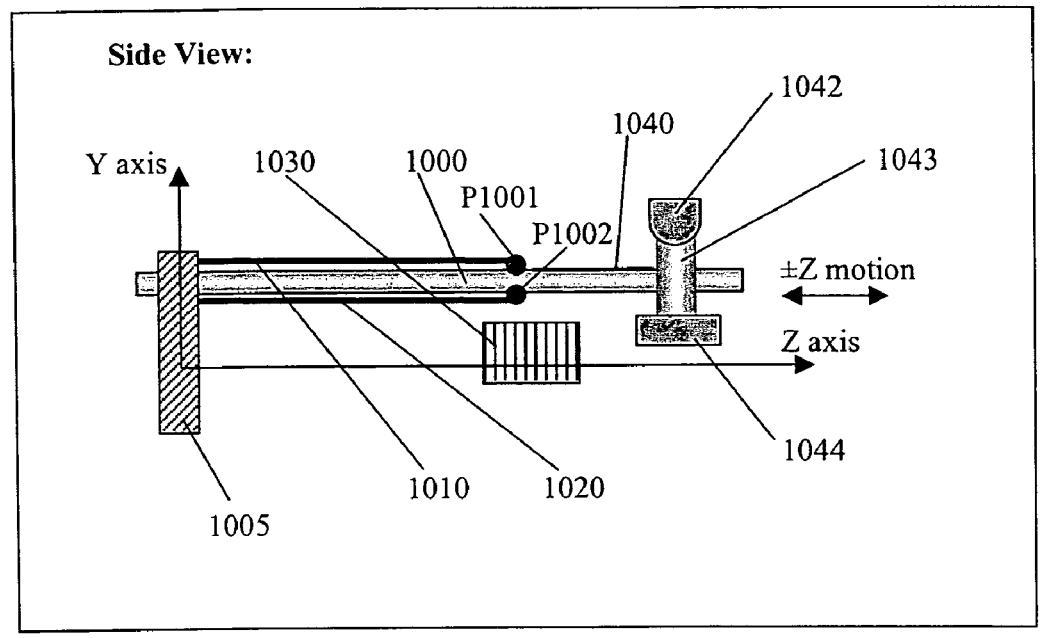

An embodiment for translational motion in the Z direction is shown in FIGS. 10*a* and 10*b*. The device includes a conduit 1000, attached to electrical conductors 1010 and 1020 carrying currents regulated by the servo controller (not shown).

The shapes of conductors 1010 and 1020 are in the form of quadrupole loops. Rigorously these loops are dipoles not quadrupoles in this case; but they can be thought of as one half of a two-loop quadrupole with the second loop not used.

Current flowing in the conductors 1010 and 1020 is substantially in the X axis direction in the vicinity of the magnet 1030. The field (not shown) produced by magnet 1030 is substantially in the Y axis direction, and induces the desired Z axis translational motion in the conductors 1010 and 1020. The conduit 1000 is attached to the conductor 1010 at point P1001 and to conductor 1020 at point P2002. Both conductors 1010 and 1020 exert a force in the Z axis direction on conduit 1000. Conduit 1000 is attached to the rigid wall 1005. In this embodiment relatively small +Z axis motion is obtained from relatively large forces. However, in some applications, such as in interferometry, only small $\pm Z$ motions are required.

A shutter 1040, is also attached to the conduit 1000. Light rays 1043, from LED 1042, are partially blocked by shutter 1040 as it moves along the axis, allowing the detector 1044 to provide information on the distance the shutter 1040 moves relative to the Z axis. The distance the shutter 1040 moves relative to the Z axis can be used to determine $\pm Z$.

Figure 11A:
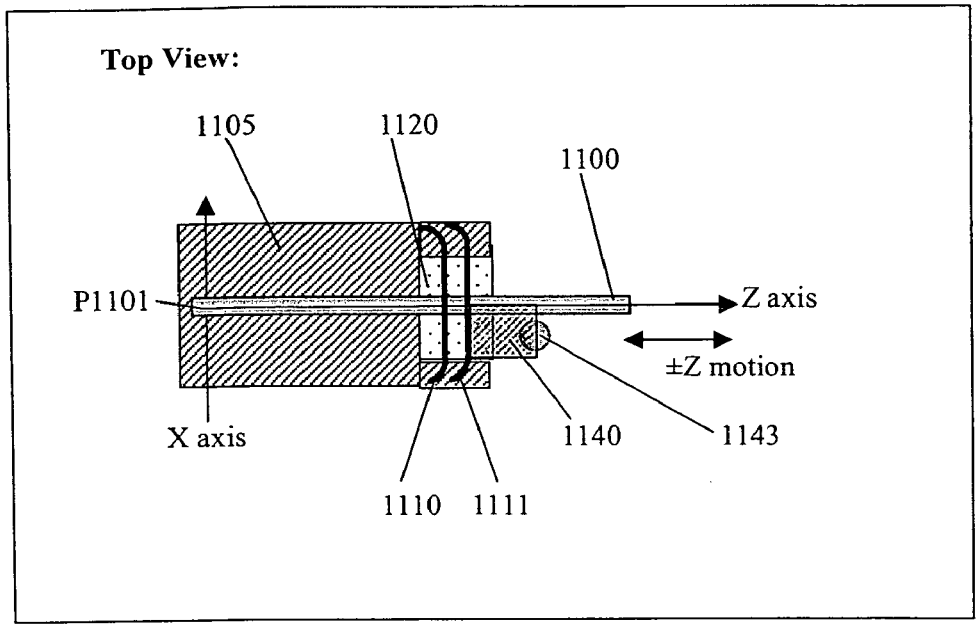
FIGS. 11a and 11b show a top and side view respectively of an embodiment of a single axial translational degree of freedom conduit moving device.
Figure 11B:
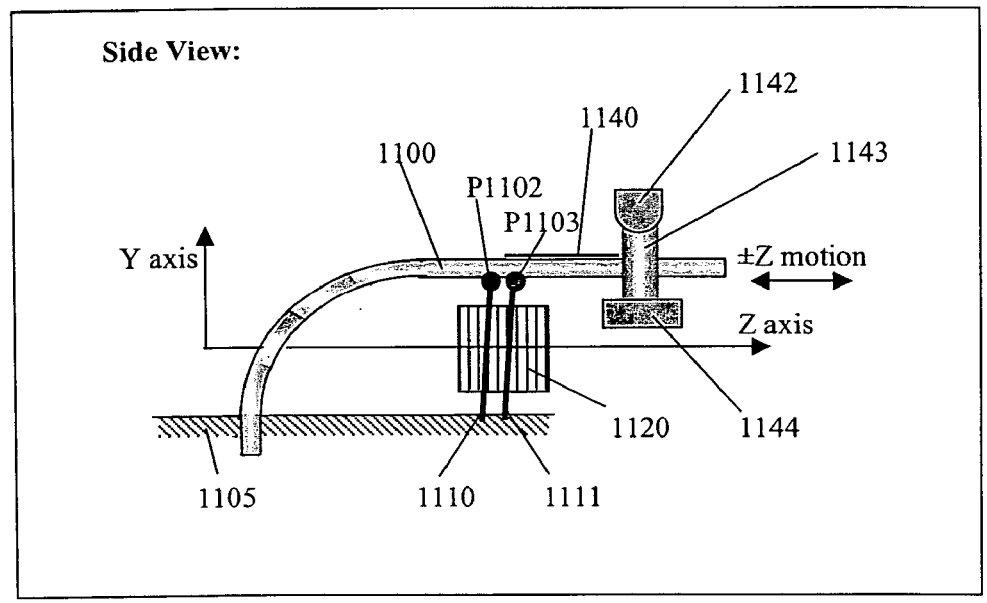

Another embodiment for translational motion in the Z direction is shown in FIGS. 11*a* and 11*b*. The device includes a conduit 1100, attached to electrical conductors 1110 and 1111 carrying currents determined by the servo controller (not shown). The conductor 1110 serves to provide the mechanical pre-stress forces in conduit 1100, at point P1101, required for the 90° bend shown. Other pre-stress bends greater than 90° will also serve this same purpose. Pre-stress bends less than 90° can also be used with diminishing returns of efficiency for reducing the elongate forces. The pre-stress forces may also be induced in the manufacture of conduit 1100, where the bend angle is permanently formed into the conduit shape.

The quadrupole loop is formed by the shape of conductors 1110 and 1111. Rigorously these loops are dipoles not quadrupoles in this case; but they can be thought of as one half of a two-loop quadrupole with the second loop not used.

The magnetic field (not shown) from magnet 1120, is substantially in the Y axis direction. Current flowing in conductors 1110 and 1111, in substantially the X axis direction induces a Z axis motion in the conductors 1110 and 1111. The conductors 1110 and 1111, connected to conduit 1100, at points P1102 and P1103, exert a force on conduit 1100 in the Z axis direction thereby moving the conduit 1100 in the $\pm Z$ direction.

With a single conductor 1110 (e.g., when conductor 1111 is not used) there is a tendency for an undesired rotation of the conduit 1100 in the ψ direction. The addition of conductor 1111 tends to minimize this undesired ψ rotation.

A shutter 1140 is also attached to the conduit 1100. Light rays 1143 from LED 1142 are partially blocked by shutter 1143 allowing detector 1144 to provide information on the distance the shutter 1140 moves relative to the Z axis. The distance the shutter 1140 moves relative to the Z axis can be used to determine $\pm Z$.

Case IV: Two Rotational Degrees of Freedom and Four Restricted Degrees of Freedom:

The degrees of freedom for the light beam are a desired rotation in θ about the X axis and a rotation in ψ about the Y axis, and the other motions in Φ, X, Y, and Z are restricted by the stiffness resulting from the device structural geometrical design.

Figure 12A:
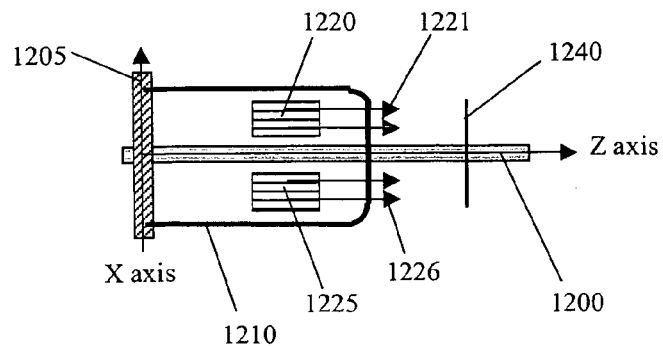
FIGS. 12a, 12b, and 12c show a top, side, and front view respectively compound rotational degree of freedom conduit moving device.
Figure 12B:
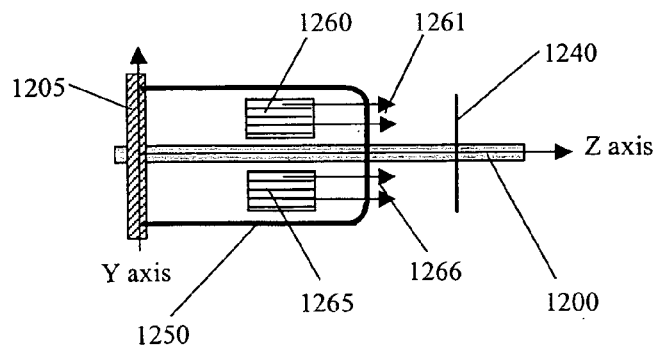
Figure 12C:
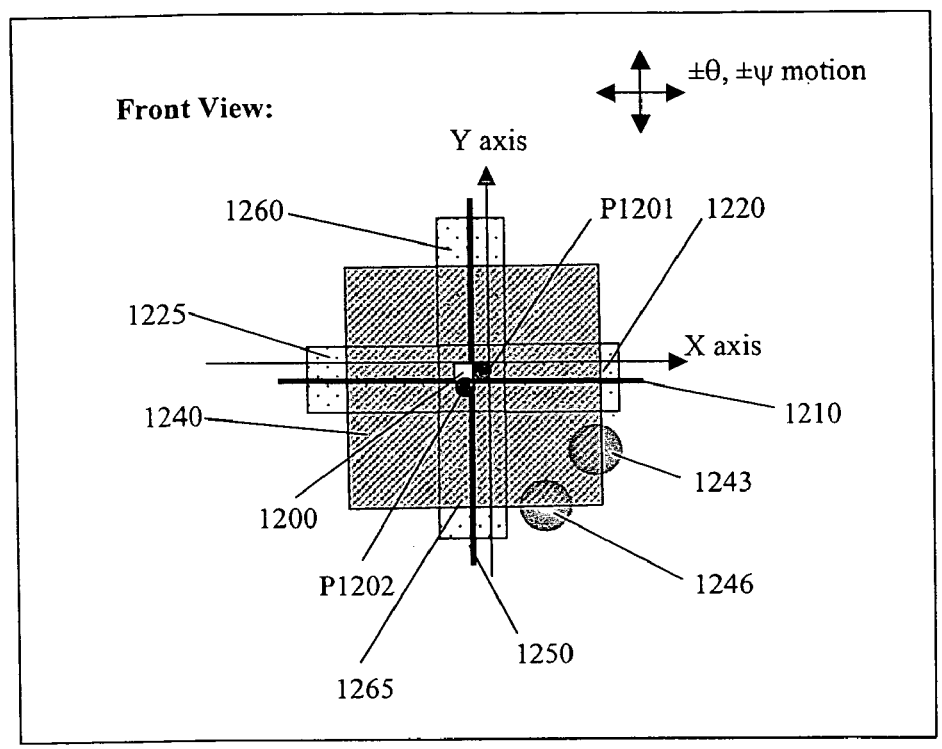

An embodiment for this compound axis rotational motion is shown in FIGS. 12a, 12b, and 12c. The device includes a conduit 1200 attached to a first conductor 1210, carrying a current regulated by the servo controller (not shown). A second crossed conductor 1250, carrying a current independently provided by the servo controller (not shown) is also attached to the conduit 1200. A rigid wall 1205 holds the conduit 1200 the two ends of conductor 1210 and the two ends of the crossed conductor 1250.

The quadrupole loop is formed by the first conductor 1210 and by the second crossed conductor 1250. The crossing point is shown in FIG. 12c. The conductors are electrically insulated from each other near this point.

Current flows through the first conductor 1210 that is substantially in the Y axis direction in the vicinity of magnetic field 1221 generated by magnet 1220 and in the vicinity of magnetic field 1226 generated by magnet 1225. Because the magnetic fields 1221 and 1226 are substantially in the Z axis direction the induced motion of conductor 1210 is in the X axis direction.

Current flows through the second crossed conductor 1250, that is substantially in the X axis direction in the vicinity of magnetic field 1261 generated by magnet 1260, and in the vicinity of magnetic field 1266 generated by magnet 1265. Because the magnetic fields 1261 and 1266 are substantially in the Z axis direction the induced motion of conductor 1250 is in the Y axis direction.

The conductor 1210 is attached to the conduit 1200 at point P1201, and the second crossed conductor 1250 is attached to the conduit 1200 at point P1202. The forces exerted on conduit 1200 from the conductors 1210 and 1250 combined with the reaction forces due to the rigid wall 1205 produce the desired compound rotations of conduit 1200 in ±θ about the X axis and in ±ψ about the Y axis.

A shutter 1240 is also shown attached to the conduit 1200. As shown in FIG. 12c, light beam 1243 generated by a source (not shown) and detected by a detector (not shown) can produce the X axis information to determine ±ψ. Similarly light beam 1246 can be used to produce the Y axis information to determine ±θ.

Case V: Two Rotational Degrees and One Translational Degree of Freedom and Three Restricted Degrees of Freedom:

In this embodiment, the degrees of freedom for the light beam are a desired rotation in θ about the X axis, a rotation in ψ about the Y axis, and a translational degree of freedom in Z. The other motions in Φ, X, and Z are restricted by the stiffness resulting from the device structural geometrical design.

Figure 13A:
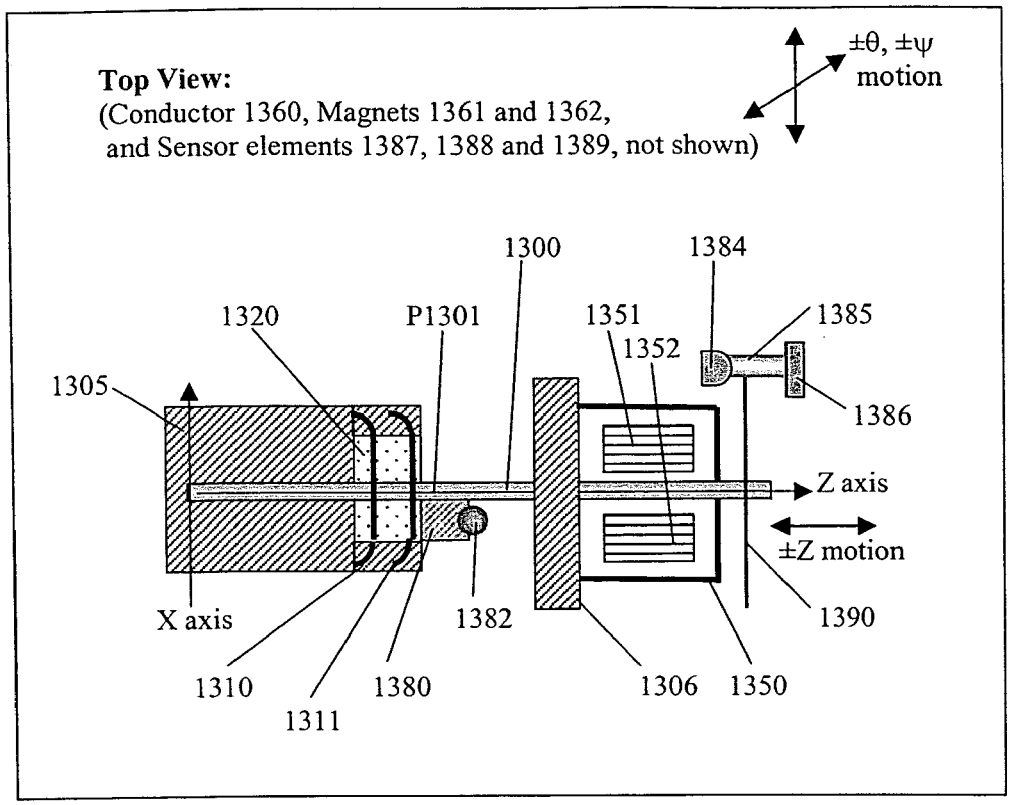
FIGS. 13a, 13b, and 13c show top, side, and front views respectively of a compound rotational degree of freedom also including an axial translational degree of freedom conduit moving device.
Figure 13B:
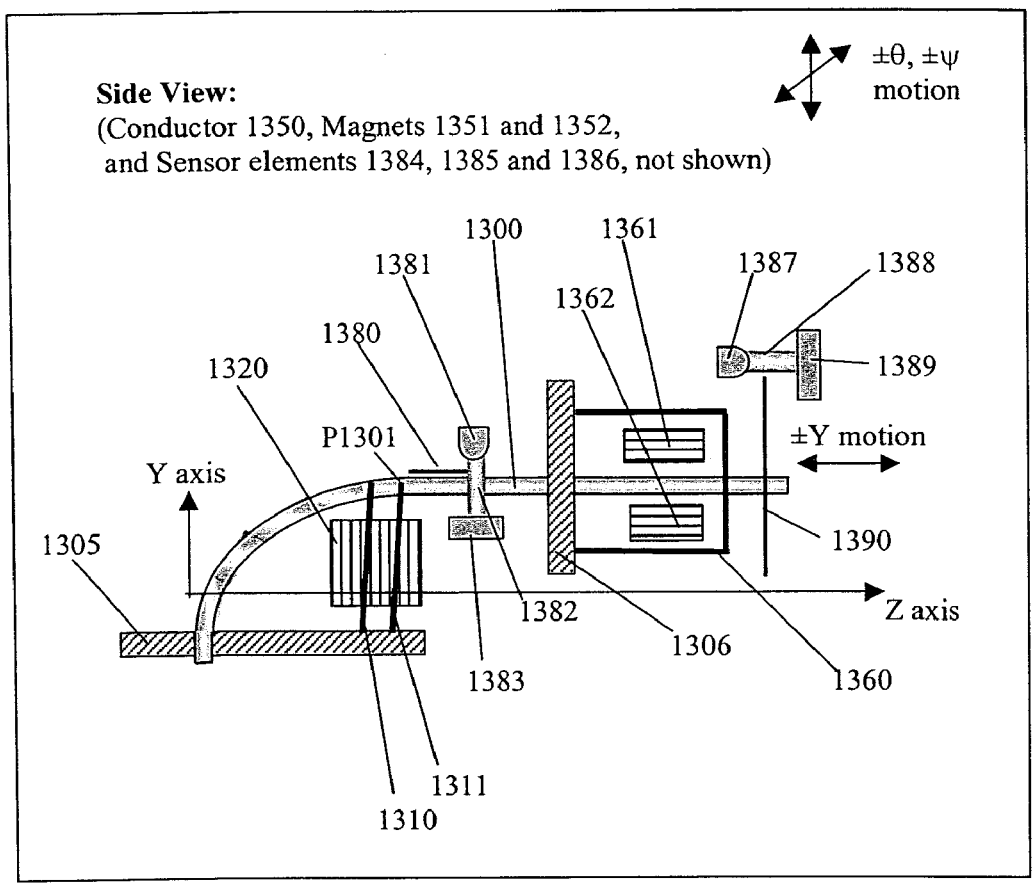
Figure 13C:
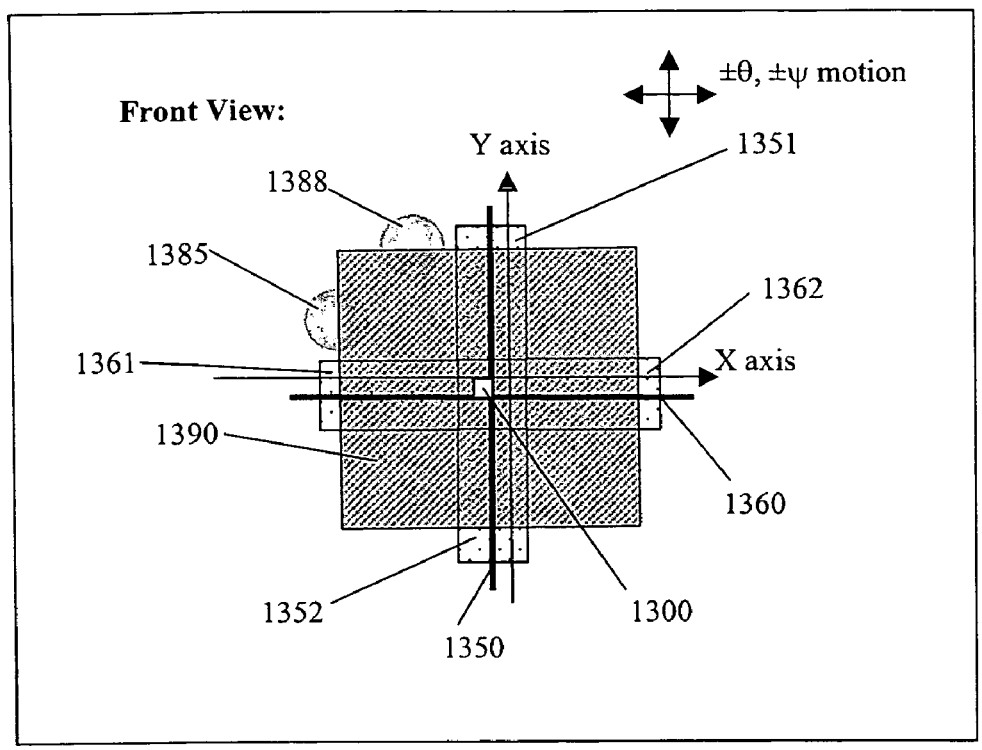

In this embodiment for the compound axis rotational motion including a translational movement is shown in FIGS. 13a, 13b and 13c. The device includes a conduit 1300 attached to a first and second electrical conductor 1310 and 1311 carrying a current provided by the servo controller (not shown). The magnet 1320 produces a magnetic field in the vicinity of the conductors 1310 and 1311. This part of the embodiment is similar to Case III where the conductors 1310 and 1311 combine with the rigid wall 1305 to produce forces on conduit 1300 and serves to produce motion in the ±Z direction. The conductors 1310 and 1311 also serve to hold the conduit 1300 fixed in X, and in Y at or near to location P1301.

Also attached to the conduit 1300 is an electrical conductor 1350 carrying a separate current generated by the servo controller (not shown). The magnets 1351 and 1352 produce a magnetic field, substantially in the Z axis direction (not shown) in the vicinity of conductor 1350. The conductor 1350, is also held by rigid wall 1306. Rigid wall 1306 has an opening to allow the conduit 1300 to pass through freely. This part of the embodiment is similar to Case IV and serves to produce motion in the ±θ direction where the rotation is defined about P1301.

With reference to FIG. 13b also attached to the conduit 1300 is a crossed electrical conductor 1360 carrying a separate current generated by the servo controller (not shown). The magnets 1361 and 1362 produce a magnetic field, substantially in the Z axis direction (not shown) in the vicinity of crossed conductor 1360. The crossed conductor 1360 is also held by rigid wall 1306. Rigid wall 1306 has an opening to allow the conduit 1300 to pass through freely. This part of the embodiment is similar to Case IV and serves to produce motion in the ±ψ direction where the rotation is defined about P1301.

In this embodiment two prior cases have been combined into a single device that is able to selectively produce rotational and translational movement of the end of the conduit. Thus when light is introduced through the conduit, the light beam may be selectively moved by moving the conduit using these conductors.

A few features will become apparent. First, the movement is selectable in either of the two rotational movements and in the one translational movement. Thus, the conduit could be moved in both rotations and one translational direction, or just rotated or translated. This would depend on the current traveling through the conductors.

Second, the rigid walls may be any secure mounting on which the conduit and/or conductors may be securely attached such that the attachment location does not move (either rotate or translate). It may be desirable to use an actual wall in which the effects of magnetic fields from either modules are shielded from downstream modules.

Third, the single, unitary conduit may be envisioned as a number of short flexible, elongate conduits joined end to end. This does not require physically separate conduits that are joined. Instead, it is a model for how the conduits behave. In FIGS. 13a, 13b, and 13c, the elongate conduit 1300 may extend through a rigid wall 1306, and be joining at a distal point to optics for introducing light through the conduit. Since this distal end of the conduit is not constrained in motion, it is able to freely move both rotationally and translationally in all six degrees of freedom. However, with the present device, the attachment of the conductors can place some desired constraint on movement in addition to some desired drive thereby to move in substantially only the desired degrees of freedom.

A Z shutter 1380 is also attached to the conduit 1300. Light rays 1382 in the Y direction from LED 1381 are partially blocked by this Z shutter 1380 depending on the shutter's (and thus the conduit's) position. This allows the detector 1384 to provide information on the distance the Z shutter 1380 moves relative to the Z axis. The distance the Z shutter 1380 moves relative to the Z axis can be used to determine ±Z. This is the same as the position sensing in Case III, shown in FIGS. 11a and 11b.

A θ, ψ shutter 1390 is also shown attached to the conduit 1300. Light rays 1385 in the Z direction from LED 1384 are partially blocked by this θ, ψ shutter 1390 allowing the detector 1386 to provide information on the distance the θ, ψ shutter 1390 moves relative to the Y axis in the X axis direction. The distance the θ, ψ shutter 1390 moves relative to the Z axis in the X axis direction can be used to determine ±ψ.

The same θ, Ψ shutter 1390 can also determine ±θ. Another beam of light 1388 in the Z direction from LED 1386 is partially blocked by this θ, ψ shutter 1390 allowing a third detector 1389 to provide information on the distance the θ, ψ shutter 1390 moves relative to the Z axis in the X axis direction. The distance the θ, ψ shutter 1390 moves relative to the Z axis in the X axis direction can be used to determine ±θ. This is similar to the position detector described in conjunction with FIGS. 12*a*, 12*b*, and 12*c*. The alternative position sensing options may also be used.

Case VI: Combination of Two Above Cases Producing Two Rotational and Two Translational Degrees of Freedom and Two Restricted Degrees of Freedom:

In the next illustrated embodiment the degrees of freedom for the optical beam at the distal face of the conduit are a desired compound rotation in θ about the X axis and in ψ about the Z axis, and dual translational degrees of freedom in X and Y. The other motions in Φ and Z are restricted by the stiffness resulting from the structural geometrical design.

Figure 14A:
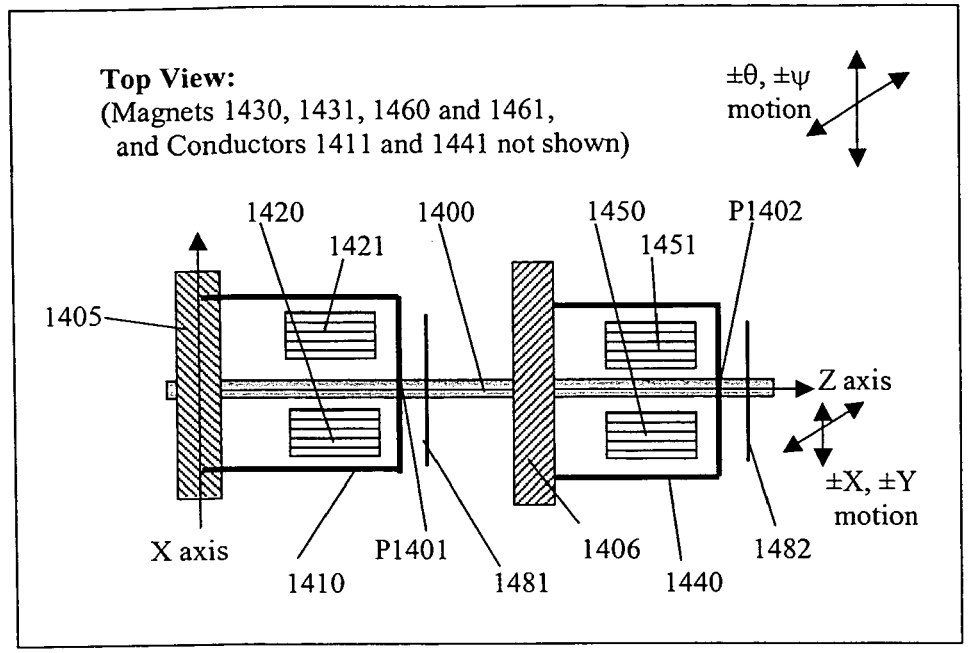
FIGS. 14a and 14b show a top and side view of a compound rotational degree of freedom also including two translational degrees of freedom conduit moving device.
Figure 14B:
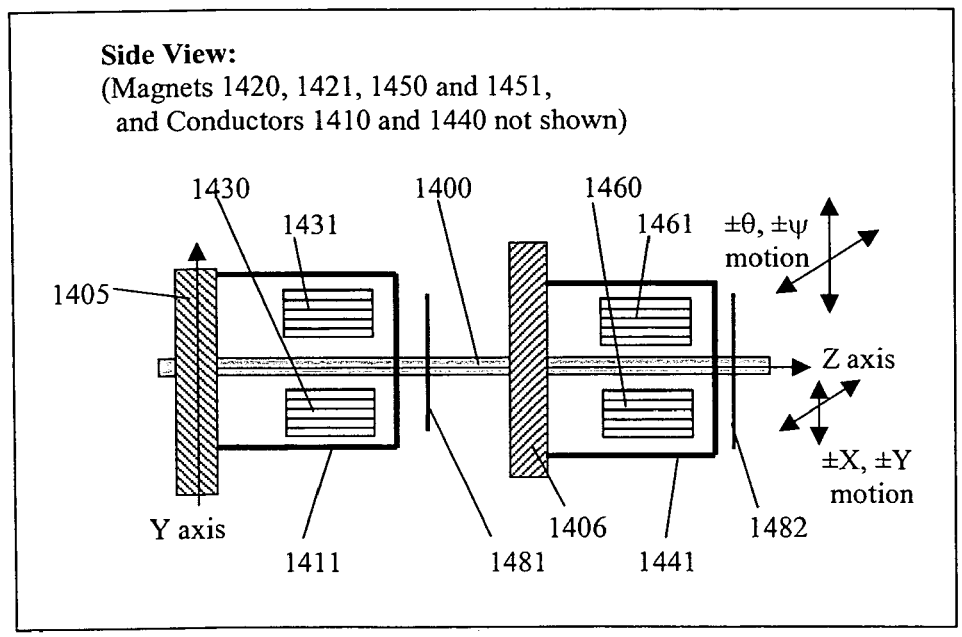

One embodiment for the compound axis rotational motion including a dual translational movement is shown in FIGS. 14*a* and 14*b*. The device consists of a conduit 1400 attached to an electrical conductor 1410, at point P1401 and attached at wall 1405. The conduit 1400 carries a current generated by the servo controller (not shown). The magnet 1420 produces a field (not shown) in the Z axis direction in the vicinity of the conductor 1410. A second crossed conductor 1411 is attached to conduit 1400 near to point P1401 and insulated from conductor 1410 near this point. Magnets 1430 and 1431 produce a field in the Z direction in the vicinity of conductor 1411. This part of the embodiment is similar to Case IV as shown in FIGS. 12*a* and 12*b*, and serves to produce motion in the ±X and ±Y directions of conduit 1400 at point P1401. Also attached to the conduit 1400 is another electrical conductor 1440 held by wall 1406 carrying a current generated by the servo controller (not shown). The magnets 1450 and 1451 produce a field in the Z axis direction in the vicinity of the conductor 1440. Also attached to the conduit 1400 is another crossed electrical conductor 1441 held by wall 1406 carrying a current generated by the servo controller (not shown). The magnets 1460 and 1461 produce a field in the Z axis direction in the vicinity of the conductor 1441. This part of the embodiment is also similar to Case IV and serves to produce motion in the ±X and ±Y directions as shown in FIGS. 12*a* and 12*b*, for conduit 1400, near to point P1402.

Because conduit 1400 has ±X, and ±Y transverse forces exerted on it at both points P1401 and P1402 in addition to the reaction forces of rigid wall 1405 the face near the distal end of conduit 1400 may be both controlled in the compound angle and in dual translations.

A first shutter 1481 is also attached to the conduit 1400 near point P1401. This shutter acts with a light source and detection source as described in conjunction with FIGS. 12*a* and 12*b*. The distance first shutter 1481 moves relative to the Z axis in both the X axis direction and Y axis direction can be used to determine a position (X1,Y1) of the conduit 1400 near point P1401.

Similarly second shutter 1482 can determine a position (X2,Y2) of the conduit near point P1402 with two more sensors (not shown).

The desired translational motions of the end of the conduit 1400 in the X and Y directions can be determined from X2 and Y2.

The desired compound rotations θ, ψ of the end of the conduit 1400 in θ can be determined from the difference X2 minus X1, and in ψ can be determined from the difference Y2 minus Y1.

Figure 15:
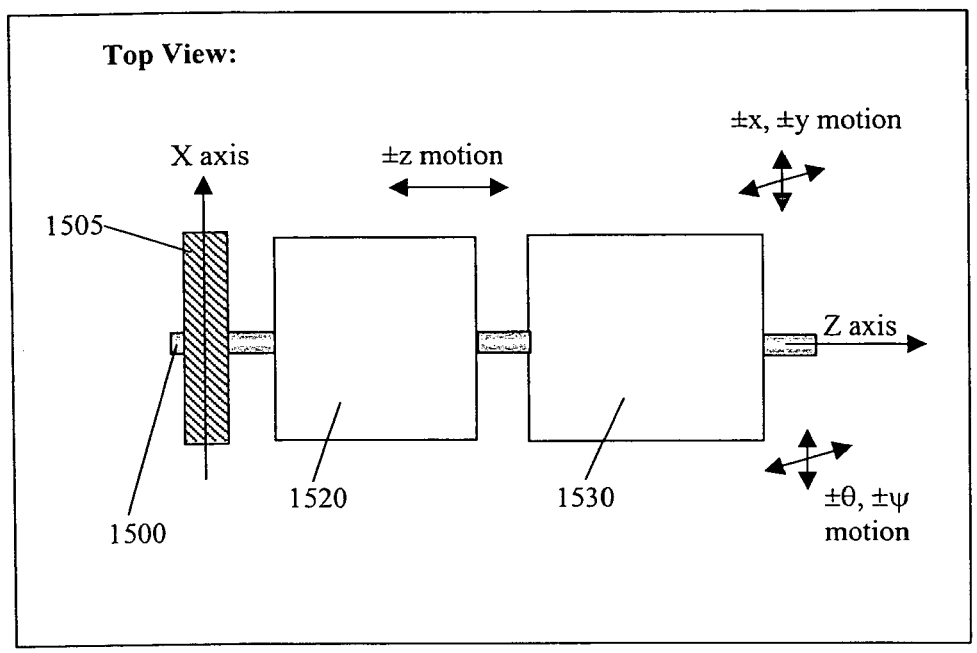
FIG. 15 shows a top view of an illustrative model of a compound rotational degree of freedom including three translational degrees of freedom conduit moving device.

Case VII: Two Rotational and Three Translational Degrees of Freedom and One Restricted Degree of Freedom:

Case VII is a straightforward combination of a Case VI embodiment 1530 and Case III embodiment 1520 to produce all three translations, a compound angle in θ and ψ, and restricts ±Φ motion of the light beam. This is shown in FIG. 15.

Figure 16:
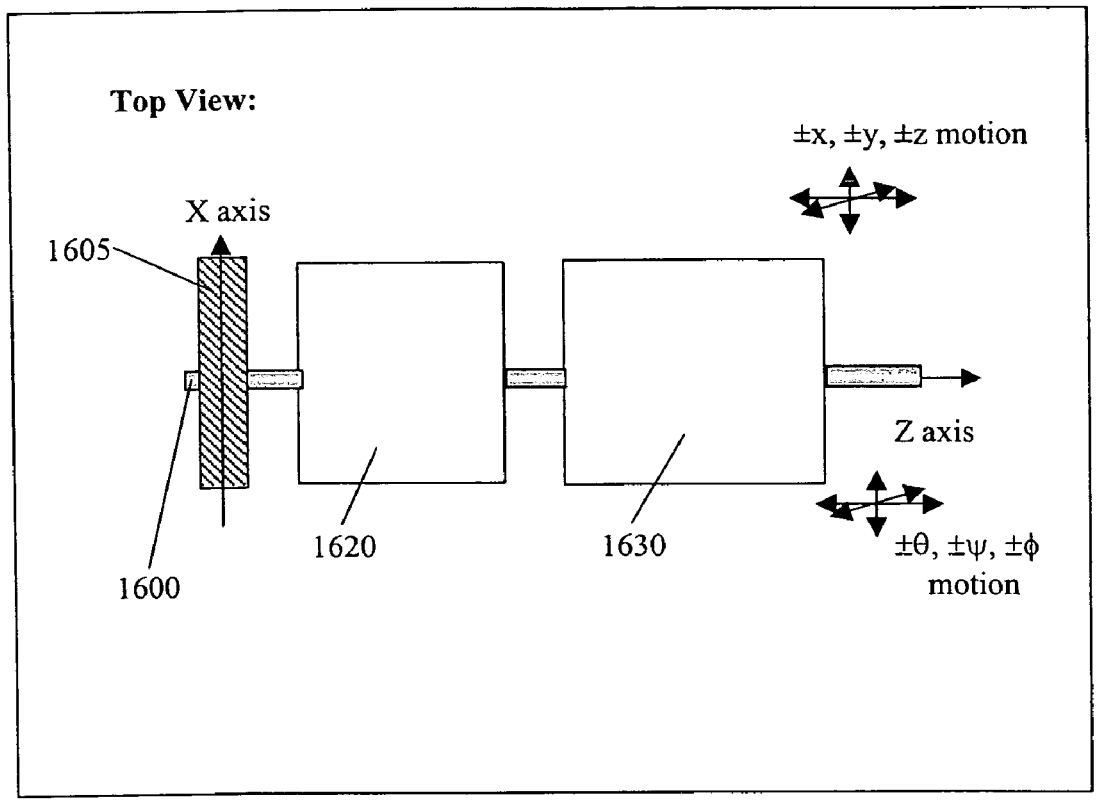
FIG. 16 shows a top view of an embodiment that enables movement of conduit end in all six degrees of freedom.

Case VIII: Combination of Two SFCs with Three Rotational and Three Translational Degrees of Freedom and No Restricted Degrees of Freedom:

Case VIII is a non-straightforward combination of a Case VII embodiment 1630, and Case II embodiment 1620, to produce all three translations, and all three rotations of the light beam at the distal end of conduit 1600. This is shown in FIG. 16. The apparent problem with FIG. 16 is that the Φ rotation will produce an effect that tends to make the subsequent determination of the other positions ambiguous. For example, a 90° rotation in Φ will interchange the X and the Y axes for the subsequent positions. This apparent problem can be fixed by physically rotating all the subsequent sensors by Φ.

However, a more elegant solution that allows the subsequent sensors to be held fixed to the rigid walls in the spirit of the other quadruflexures disclosed herein, is given by a prescription in Marion, "Classical Dynamics" 1965, Chapter 13, Section 13.7: The Eulerian Angles, page 391. A unitary rotation transformation (Equations 13.62 for example from Marion), can be applied to each subsequent position value to take into account the effect of the axial rotation Φ.

Similarly when an axial rotation precedes the subsequent motions it is generally possible to use a unitary rotation transformation to correct the subsequent sensor position values using the value of the axial rotation. Furthermore as described in Marion, one or more axial rotations may precede one or more axial rotations. This gives rise to an exceeding difficult conceptual motion. However, the elegance of the unitary rotation transformation mathematics, allows a completely straightforward method for accounting for this complexity.

For example, three position sensors can define the position of a point on the conduit as the vector set of values (X1',Y1', Z1'). Knowing that an axial rotation Φ, of the conduit about the Z axis precedes these sensors, then the unitary rotation transformation can be used to determine the actual position of the conduit as the vector set of values (X1,Y1,Z1):

$$\begin{pmatrix} X1 \\ Y1 \\ Z1 \end{pmatrix} = \begin{pmatrix} \cos(\Phi) & \sin(\Phi) & 0 \\ -\sin(\Phi) & \cos(\Phi) & 0 \\ 0 & 0 & 1 \end{pmatrix} * \begin{pmatrix} X1' \\ Y1' \\ Z1' \end{pmatrix}$$

Assuming the axial rotation is Φ=90°, then Z1 is not changed (i.e. Z1=Z1'), X1=Y1', and Y1=−X1'. As expected the X and Y axes are interchanged. Typically however, for devices described herein, the axial rotations will be small and less than 90°.

This now completes the general description of the conduit moving embodiments with the obvious inference that many other combinations of embodiments are possible depending on the exact nature of the desired motion of the conduit and the light beam.

PIDB Servos: 1 Step Example:

With the position information, x(t), of a conduit movement recorded both as a voltage and as an unambiguous function of time by the sensors, a PIDB servo controller (where P is Proportional to x(t), I is the Integral of x(t), D is the Derivative of x(t), and B is Boost as described below) can then use the x(t) information to substantially improve the accuracy and the efficiency of the desired conduit movement. The basic functions of such a PIDB servo controller are shown in FIG. 17.

The sensor voltage 1700 is subtracted from the control voltage 1710 producing a difference voltage 1720 also commonly referred to as the error signal. The difference voltage 1720 can be amplified or reduced by an amplifier to make the proportional voltage 1730. The difference voltage 1720 can be integrated to make the integral voltage 1740. The difference voltage 1720 can also be differentiated to make the differential voltage 1750.

Figure 17:
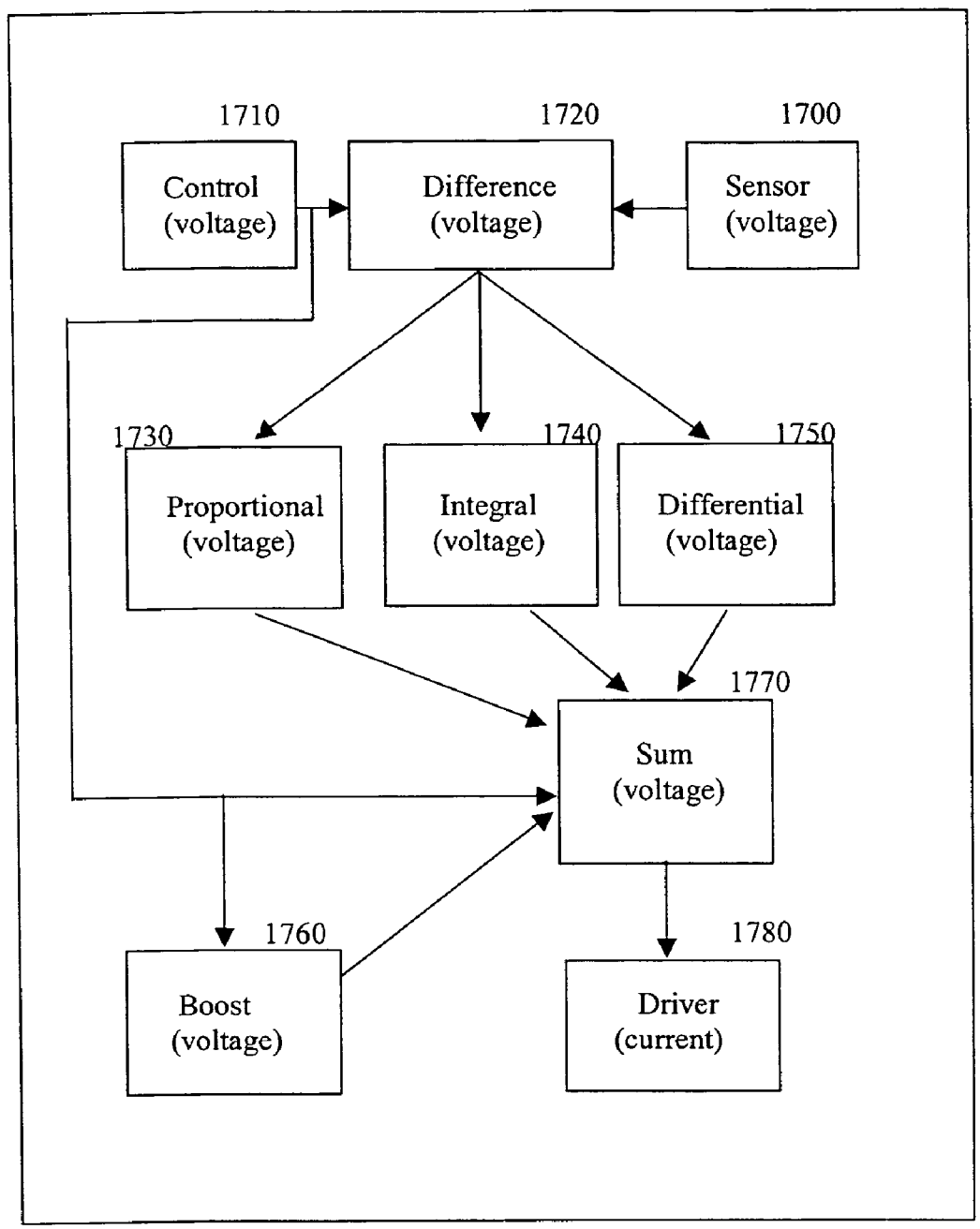
FIG. 17 shows a PIDB functional diagram.

A boost voltage 1760 can be derived from the control voltage 1710 (as described below), and the sum voltage 1770 can be made by adding the voltages as shown in FIG. 17. Typically the driver current 1780 produces a current that is more suitable than a voltage for driving the quadrupole loops of the device.

Increasing the proportional voltage 1730 increases the apparent stiffness of the conduit and allows faster motion and increases the overshoot. Increasing the integrated voltage 1740 improves the accuracy of the motion. Increasing the differential voltage 1750 increases the damping and thereby reduces the overshoot.

Increasing the boost voltage 1760, particularly when it is known a priori, can make it easier for the PIDB circuit to operate. For example in a step application it may be desirable to move at the limit of the driver actuators comprising the conductors and their associated maximum acceleration and braking forces as applied to the conduits.

The acceleration and braking forces as applied to conduits may be assumed to be approximately equal. Therefore, for a step application, the optimal boost voltage consists of a maximum step acceleration during the first half of the step transition time and a maximum step brake voltage during the second half of the transition time. The desired transition time is known a priori. In principle, these boost voltages would accomplish most of the PIDB servo control work, thereby making it easier for all the PIDB servo functions to operate in a stable manner.

In practice, there are time delays caused by inductance in the conductors, and time delays in the sensor position information. These time delays are known a priori. A preferred embodiment of the boost voltage to minimize the effects due to these time delays is a first boost voltage acceleration for time T1, followed by a first boost brake voltage for time T2, and followed by a second boost acceleration voltage for time T3. Time T1 is approximately equal to time T2. The time T3 is adjusted, (i.e. tuned), to compensate for the delays by optimizing the servo performance. The sum of times T1, T2, and T3 is approximately equal to the desired transition time.

Figure 18A:
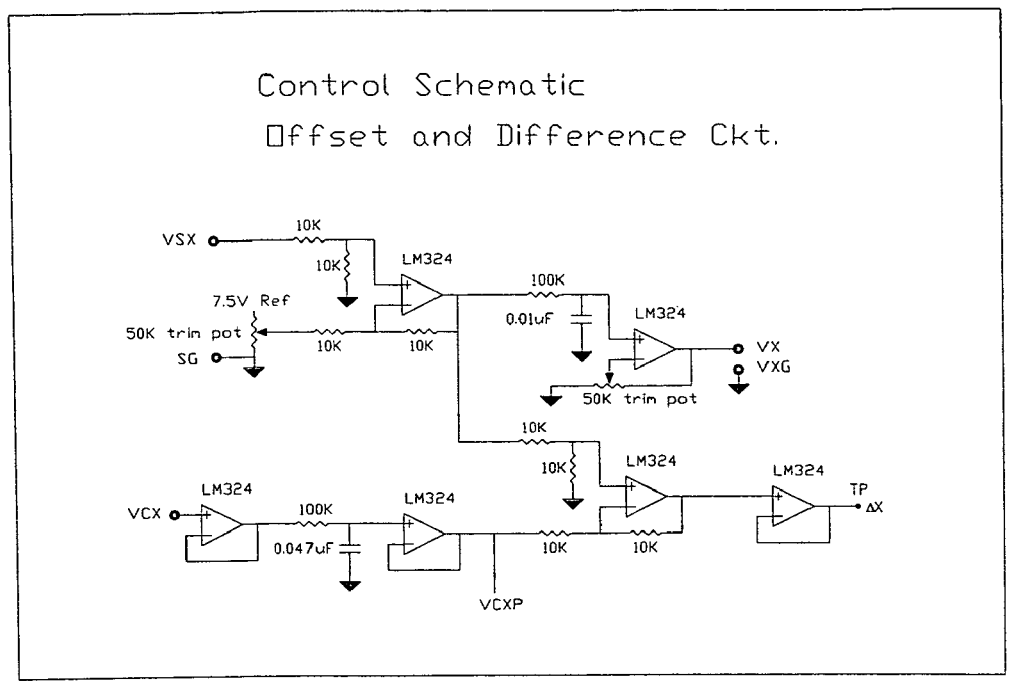
FIGS. 18a, 18b, and 18c show analog PIDB circuit diagrams.
Figure 18B:
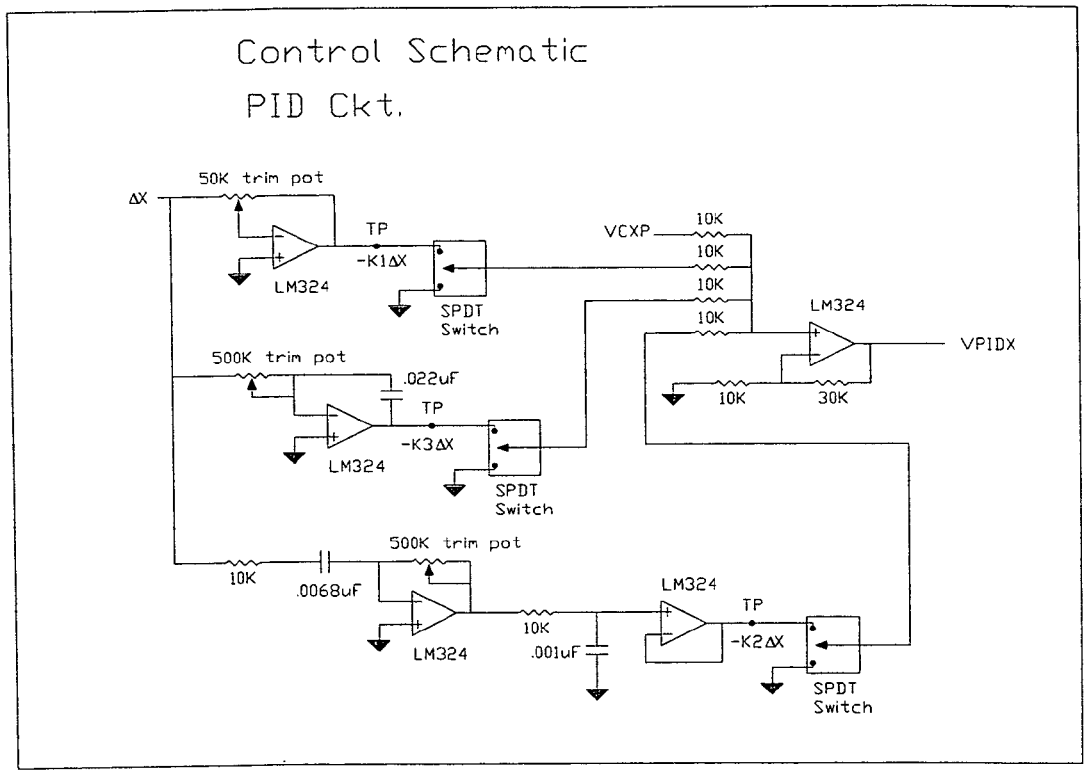
Figure 18C:
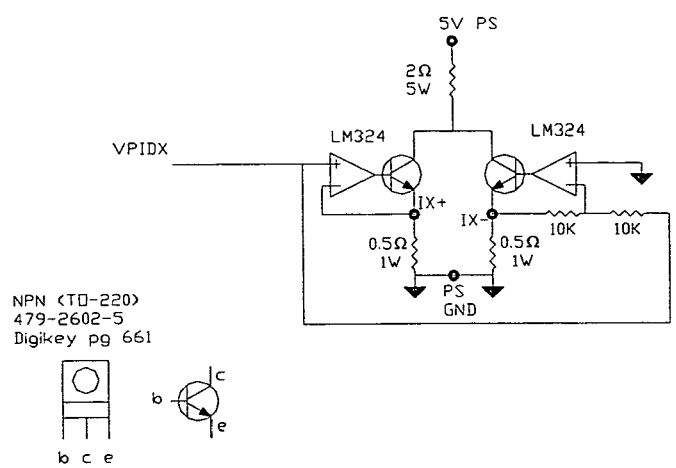

The electrical schematic shown in FIGS. 18a, 18b, and 18c is one embodiment of the PIDB servo controller with analog electronics.

Figure 19:
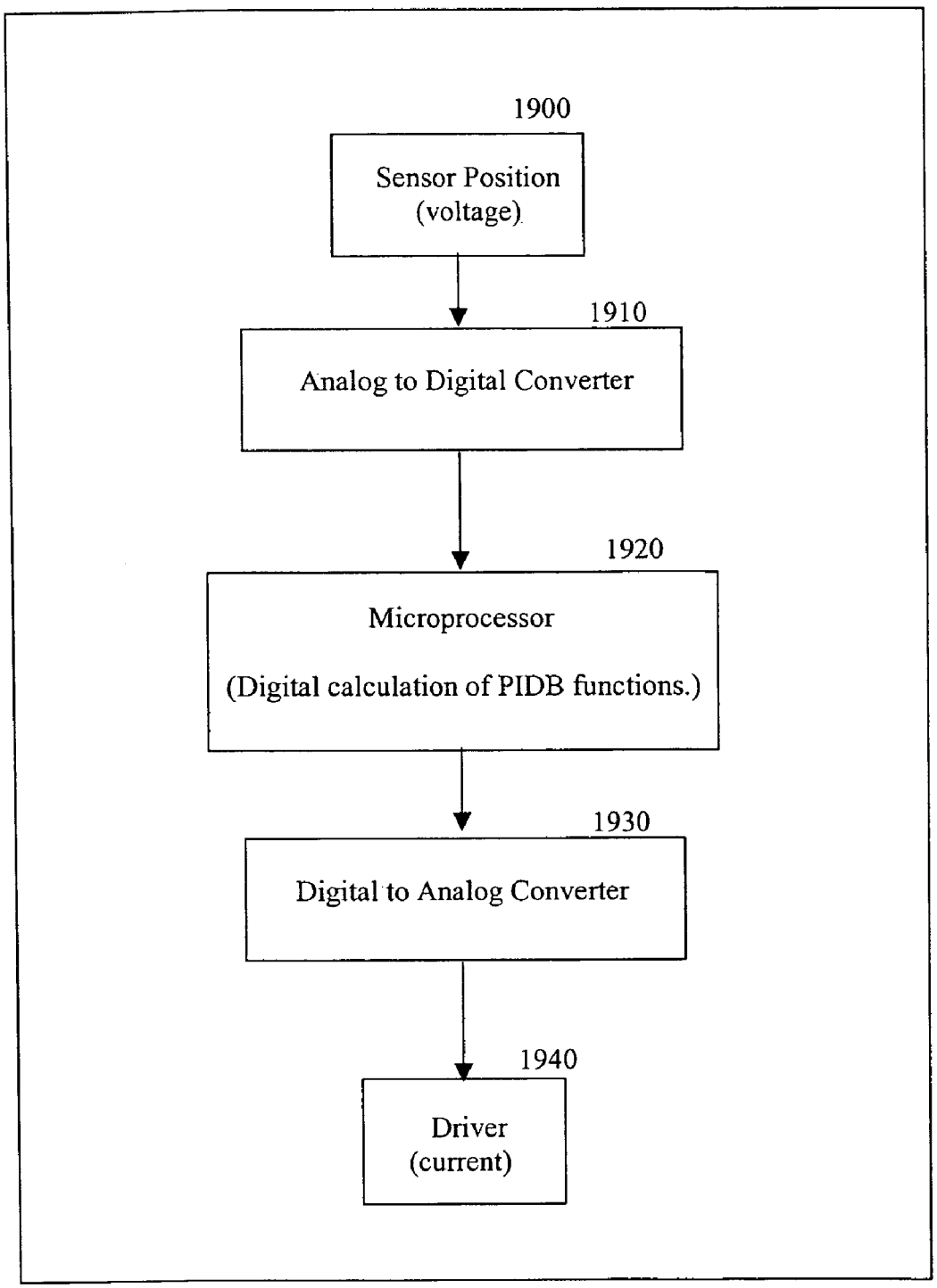
FIG. 19 shows a digital PIDB circuit diagram.

The electrical schematic shown in FIG. 19, shows another embodiment with digital electronics.

With respect to FIG. 19, a voltage from the sensor 1900 is converted by an analog to digital converter 1910 into a digital signal. This digital signal is sent to a microprocessor 1920 which effects a digital calculation of PIDB functions. The microprocessor then transmits a signal to a digital to analog converter 1930 which then signals the driver 1940 which provides the current to the conductor.

Figure 20A:
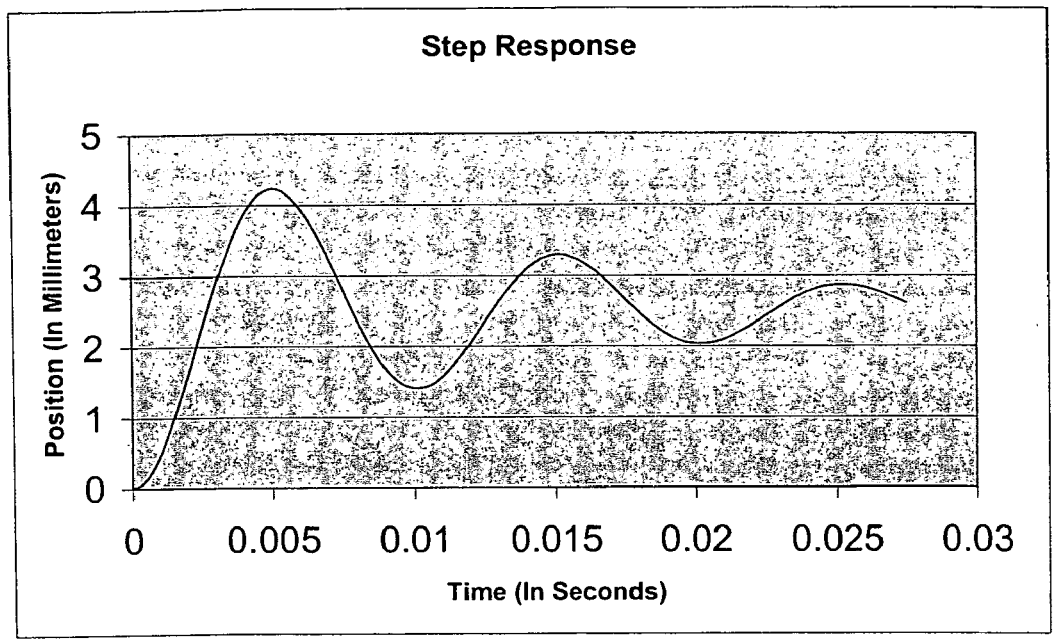
FIGS. 20a and 20b are graphs of position over time to illustrate typical performance of a PIDB servo controller.
Figure 20B:
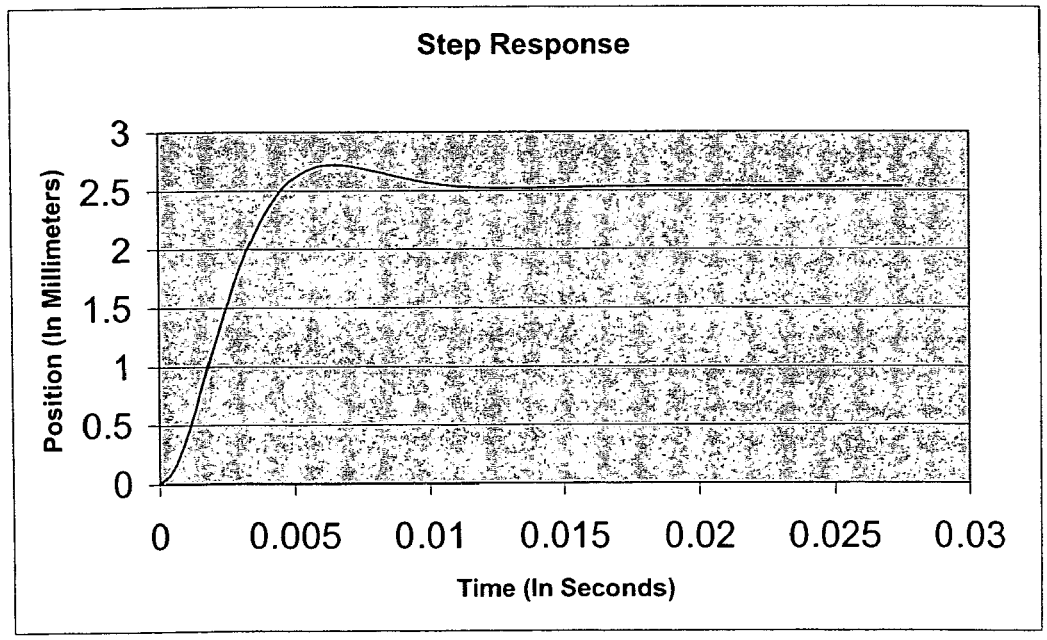

An example of the performance improvement with and without the PIDB servo controller is shown in FIGS. 20a and 20b. Because it is generally required to adjust the four PIDB values to optimize the performance, an understanding of what each adjustment does can save considerable time. The strategy for tuning the PIDB controller is best performed by starting with the derivative voltage adjustment, second the proportional voltage adjustment, next the integral voltage adjustment and finally the boost voltage adjustment. The tuning process is iterative in nature because if for example too much of the derivative voltage is applied then adjusting the subsequent PIB voltages can cause the conduit to oscillate out of control.

Both graphs in FIGS. 20a and 20b, show the motion as a function of time for the response to a step function. The motion is completely described by a differential equation (for example as described in Marion "Classical Dynamics", 1965, pages 148 to 151):

$$x'' + 2\beta x' + \omega_0^2 x = \frac{F(t)}{m}$$

where x" is the acceleration, x' is the velocity, and x is the desired position as a function of time in response to the applied force F(t). The mass is m, and the natural frequency $w_0$ is determined by the square root of the stiffness k divided by the mass m. The damping factor is $\beta$.

It is well known that the solution to this equation is:

$$x(t) = \frac{a}{\omega_0^2}\left[1 - e^{-\beta t}\cos(\omega_1 t) - \frac{\beta}{\omega_1}e^{-\beta t}\sin(\omega_1 t)\right]$$

with $$\omega_1 = \sqrt{\omega_0^2 - \beta^2}$$

and with $\beta < w_0$.

A constant force of magnitude ma is applied at time t=0, and where x(t) is for values of t>0. The graph of x(t) is shown in FIG. 20a.

The solution to the differential equation may also be directly integrated by using for example the well-known Runge Kutta methods (see for example Hildebrand, "Advanced Calculus For Application", 1962). Of course the same result is obtained and shown graphically in FIG. 20a.

When the PIDB servo is activated the driving force F(t) is no longer constant and the differential equation strictly speaking should be solved with the Runge Kutta methods. However, it turns out that both solutions remain essentially the same when the damping constant consists of the damping due to the medium plus the induced damping due to the servo circuit, and also when the stiffness is represented by the stiffness of the quadruflexure plus the induced stiffness due to the servo circuit.

In addition the improvement in the response due to the integral portion of the PIDB servo and due to the boost portion of the PIDB servo are not apparent in the exact solution to the differential equation. However, they can make substantial contributions to the improved response as shown in the graph of FIG. 20b.

There is apparently no one unique best solution of PIDB values to give the optimal result shown in the graph of FIG. 20b. However, by comparing the computed values with the experimental values it is possible to gain insight as to how to achieve the strategy for optimal tuning and best performance.

Figure 21:
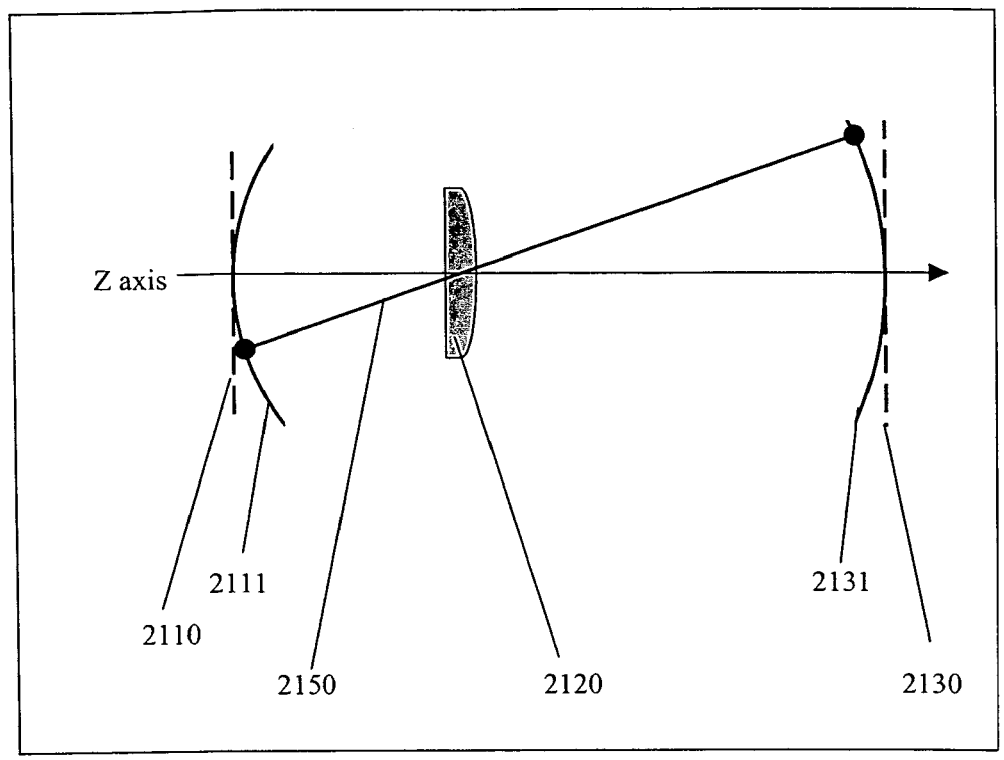
FIG. 21 shows a lens cross section showing optical paths of rays for an embodiment of the invention.

An Embodiment for Moving a Light Beam using an Imaging Lens:

An embodiment for moving a light beam features a conduit working with an imaging lens. The nature of an imaging lens is shown in FIG. 21. The imaging lens 2120 has a focal length associated with its design wherein a beam of optical rays from the object plane 2110 are focused on the image plane 2130. The lens 2120, also has an aperture associated with it that may be defined by a diameter of a circle, or the length dimensions of a rectangle, or other suitable shape defining an area of the lens. When the ratio of the dimensions of the aperture to the distance to the image plane or object plane is large, the angles measured relative to the Z axis are small and the typical lens formulas apply. See for example, Born and Wolf, "Principles of Optics" $5^{th}$ Ed. 1975, Chapter IV: Geometrical Theory Of Optical Imaging, pages 133 to 202.

However, the above angles measured relative to the Z axis may be large, as for example with a divergent beam or with a beam with a large scanning angle. In this case the object plane is a hemisphere 2111, and the image plane is also a hemisphere 2131. The typical lens performance is now degraded. Characterization of the lens performance errors may be defined as aberrations of the image in the image plane. See for example, Born and Wolf, "Principles of Optics" $5^{th}$ Ed. 1975, Chapter V: Geometrical Theory Of Aberrations, pages 203 to 232.

A ray 2150 of light from a point on the object hemisphere 2111 to a point on the image hemisphere 2131, which passes substantially through the center of lens 2120, has a special property. The special property is that all such rays have nearly the same optical path length. The property of nearly equal optical path length for rays in a beam can be used to advantage to reduce the aberrations. For example the aberration "curvature of field" is zero for this special case of rays 2150.

Likewise for rays 2150 the spherical aberration may be balanced by a defocus adjustment of the conduit in the Z axis direction. Also, because the rays 2150, pass substantially through the center of the lens the so called off axis aberrations coma, and distortion, may be minimized.

Using the theory of Petzval, page 225 Born and Wolf, for a curved image plane and object plane, the aberration astigmatism may be eliminated over a surface called the Petzval surface. Present embodiments are uniquely designed to take advantage of this condition, because they can be designed to maintain the distal face of a conduit on this Petzval surface.

Figure 22:
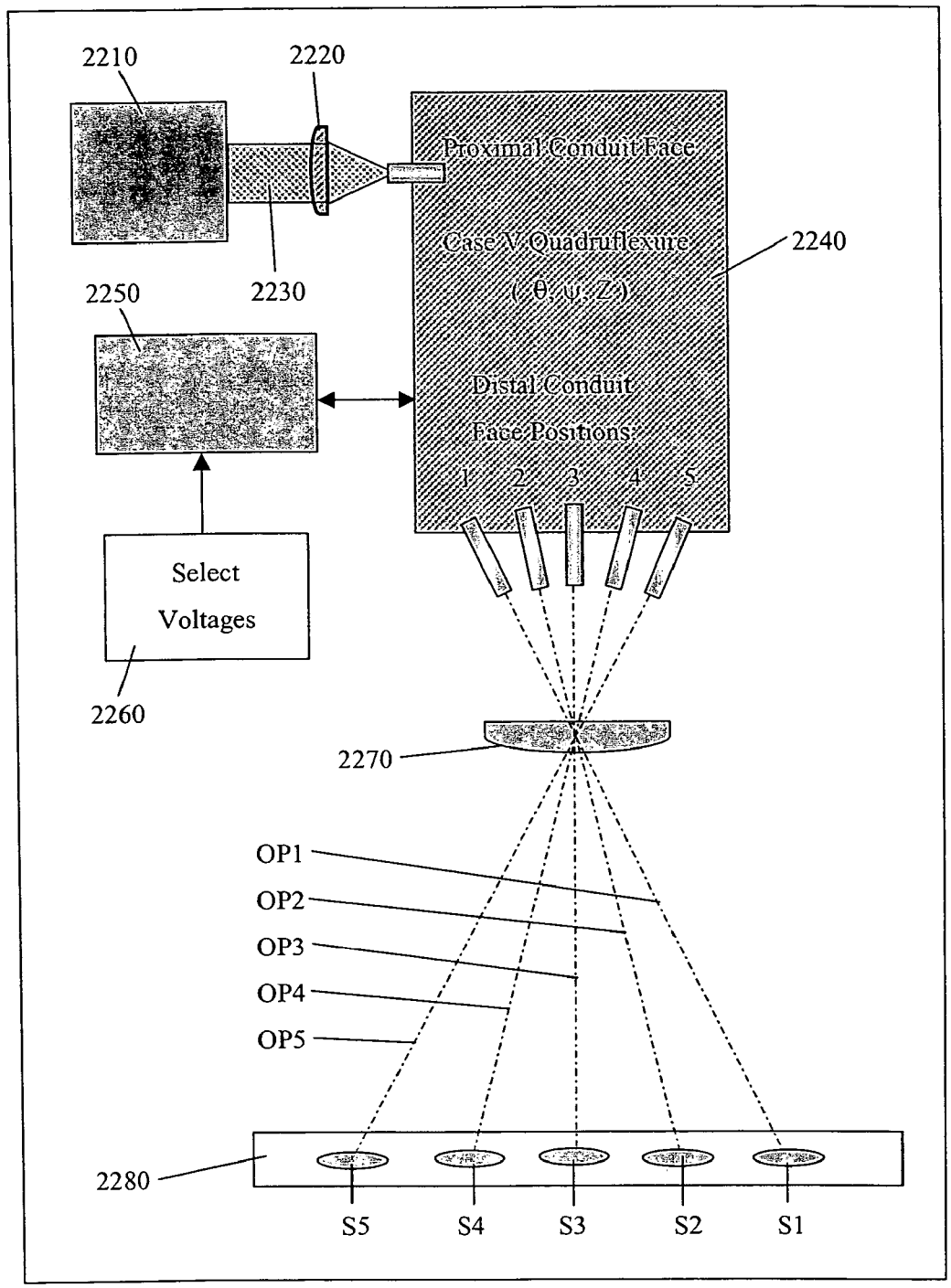
FIG. 22 is a schematic of an application of a quadruflexure with a lens illustrating the ability of the conduit moving device to provide a hemispherical scan of the image surface of the lens.

The case V conduit moving embodiment 2240, shown in FIG. 22, is designed to have the distal face of its conduit trace out substantially a hemisphere centered on lens 2270. Five individual positions of the distal face of the conduit, are shown with corresponding optical paths OP1-OP5, to imaged spots SL-S5, on image plane 2280. The spots S1-S5, while shown in one dimension, are typical of spots that may be made in two dimensions on image plane 2280, corresponding to angles θ, ψ of the conduit in case V quadruflexure embodiment 2240.

Because image plane 2280, is flat the spots S1-S5, will not be properly imaged. The conduit 2240, with the feature that the distal end face may be translated in the focus direction Z, can further compensate for the non-hemispherical shape of image plane 2280, by moving closer to lens 2270, as required to make spots S1 and S5 nearly equal to spot S3. All optical paths OP1-OP5 from the conduit distal face of the conduit to the image plane 2280 passing through the center of lens 2270 may have substantially the same optical distance providing the special property of rays 2150, as described in FIG. 21.

The conduit proximal end face may accept focused light beam 2230 from light transducer 2210 focused by lens 2220. Light transducer 2210 may be a source of a beam of light or may be a detector of a beam of light depending on the application.

Selected voltages provided by 2260 to servo controller 2250 control the conduit output face position, relative to lens 2270. The performance of the lens 2270, as limited by the typical aberrations described above, is substantially improved by the light movement provided by this embodiment.

Therefore, the system described in FIG. 22, may transmit a beam of light to, or receive a beam of light from, spots S1-S5, located on image plane 2280. Of course a plurality of spots on image plane 2280, not just S1-S5, may also be addressed by the selected voltages 2260. The selected voltages 2260, comprise a set corresponding to each spot: {angle voltages: θ1, ψ1, and focus voltage: Z1 for spot 1}, {angle voltages: θ2, ψ2, and focus voltage: Z2 for spot 2}, etc.

Embodiment for Cooperative Movement of an Array of Conduits:

A number of conduits arranged in an array may be moved cooperatively by a set of conductors. The forces and stiffnesses of the conduits and conductors forming this embodiments structure interact to provide useful stable movements. This type of arrangement can, for example, provide an optimal illumination of area at an object plane (or surface) for sending out beams of light to an image plane (or image surface), or receiving beams of light from an image plane (or image surface). This embodiment is well suited to moving a number of conduits in an array, whereby each conduit in the array has substantially the same two dimensional movements.

Figure 23A:
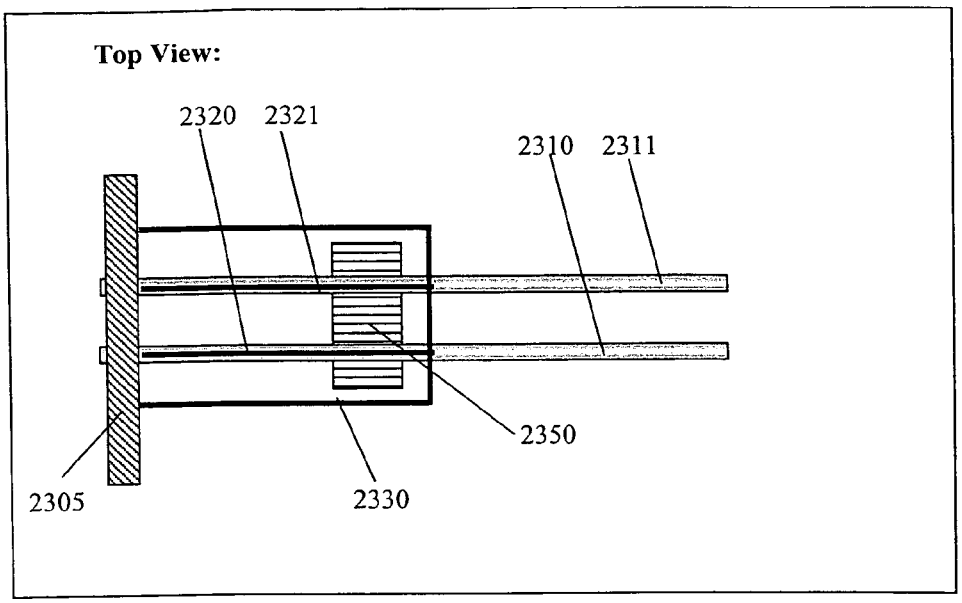
FIGS. 23a and b are a top and front view respectively of an embodiment for moving four conduits cooperatively.
Figure 23B:
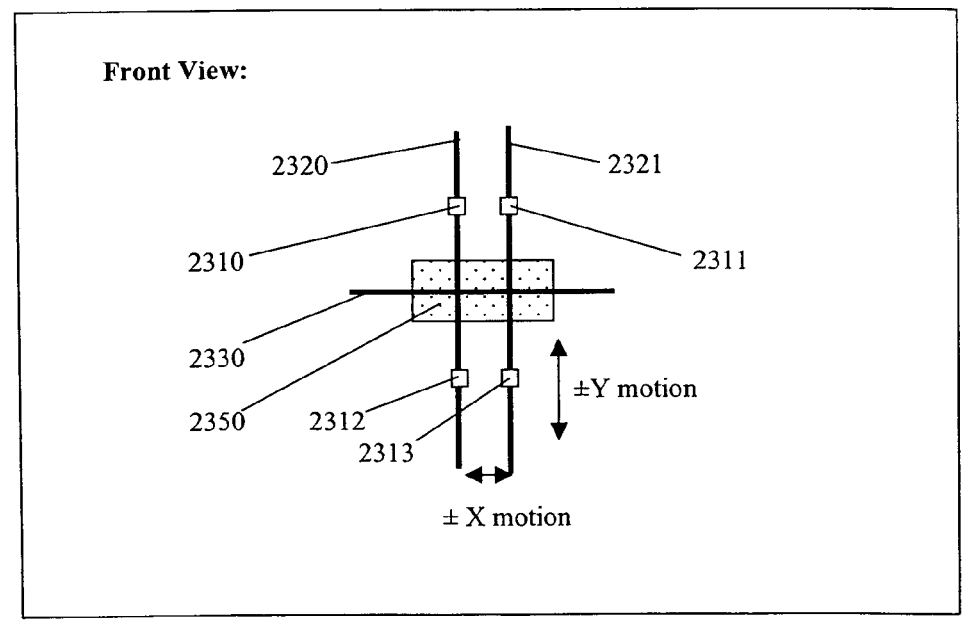

As shown in FIGS. 23a and 23b four conduits 2310, 2311, 2312, and 2313 are attached to the rigid wall 2305 at their proximal ends. Conductor 2330 attached to rigid wall 2305 carries a current that in the vicinity of a magnetic field in the Z axis direction from magnet 2350 tends to move conductor 2330 in the Y direction. Conductor 2330 is attached to conductors 2320 and 2321 and is insulated from them at the intersection points, and thereby tends to move conductors 2320 and 2321 in the Y direction.

Conductors 2320 and 2321 are also held by rigid wall 2305 and are connected to conduits 2310, 2311, 2312, and 2313 as shown. Current flowing in conductors 2320 and 2321 tends to move the conductors 2320 and 2321 in the X direction, as well as conductor 2330. Thereby the entire structure comprising the array of conduits 2310, 2311, 2312, and 2313 the conductors 2320 and 2321 and conductor 2330 can move cooperatively in the X and Y directions.

Planar Array of Conduits:

An embodiment of an array of conduits and conductors has the property that the quadrupole loops lie essentially in one plane. This has particular importance for the fabrication process of this type of device. The conductors can be made to lie on one or on two faces of a flexible substrate or flexible printed circuit board, thereby allowing a large number of these devices to be made by conventional lithography and etching techniques. Furthermore two or more of the conductors can share the magnetic field of a single magnet, allowing the composite structures to take up a relatively small space in the planar array. For example the geometry can have a good packing density.

Figure 24A:
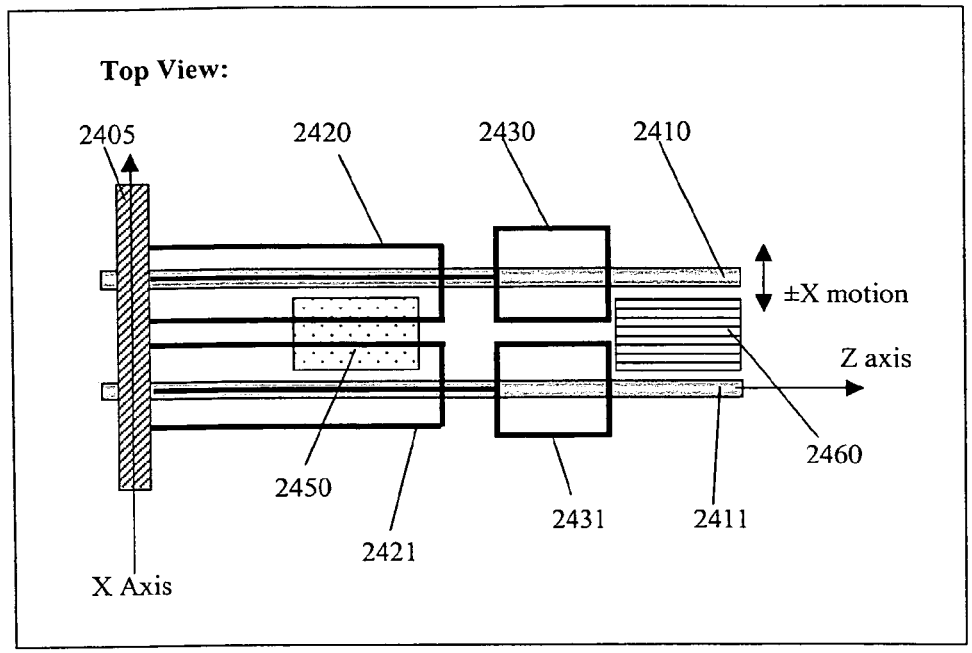
FIGS. 24a and 24b are a top and front view of a planar embodiment for moving two conduits.
Figure 24B:
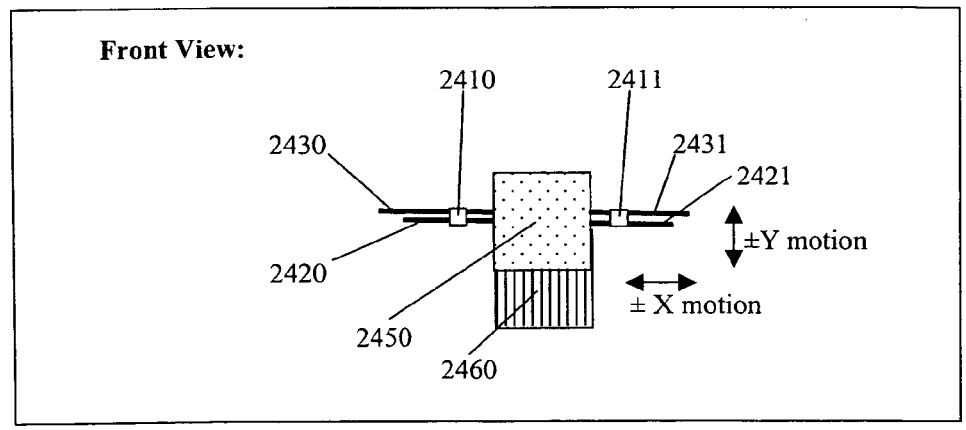

FIGS. 24a and 24b show conduit 2410 attached to rigid wall 2405, conductor 2420, and conductor 2430. In the Y direction field from magnet 2450, the conductor 2420 can move the conduit 2410 in the X direction. In the Z direction field from magnet 2460 the conductor 2430 can move the conduit 2410 in the Y direction. Conductor 2420 is insulated from conductor 2430 at the point of their intersection. The portion of the conductor 2430 from the wall to the loop is insulated to provide two current paths to and from the loop.

Similarly conduit 2411 can independently move in the X direction due to conductor 2421, in the field from magnet 2450, and in the Y direction due to the conductor 2431, in the field from magnet 2460. Conductor 2421 is insulated from conductor 2431 at the point of their intersection. The portion of the conductor 2431, from the wall to the loop, is insulated to provide two current paths to and from the loop.

Latched Conduits:

The motion of a conduit can be restricted by a latch where the purpose of the latch is to maintain the position of the conduit when power is removed. Three types of latched conduit are disclosed, suitable for constraining one, two, and multiple degree of freedom motions.

Figure 25A:
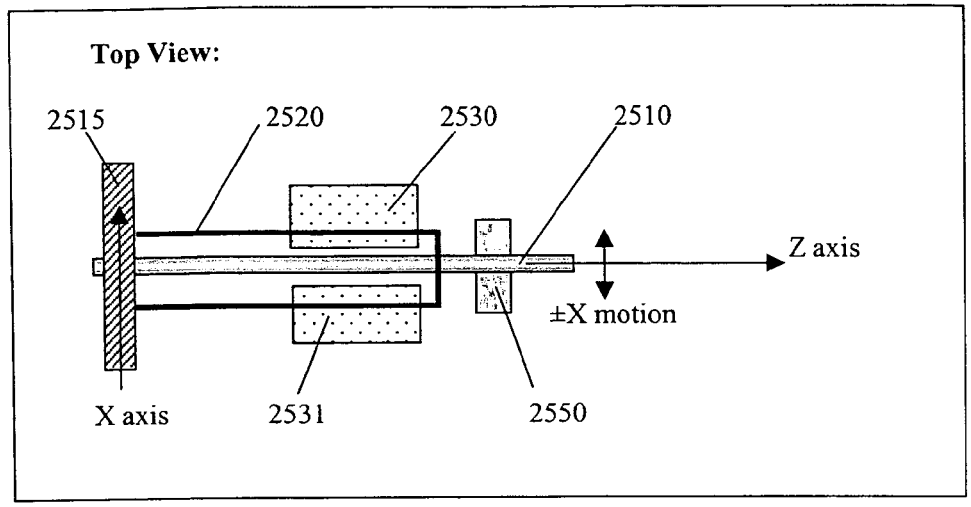
FIGS. 25a and 25b show a top and front view of a one dimensional latched conduit moving device.
Figure 25B:
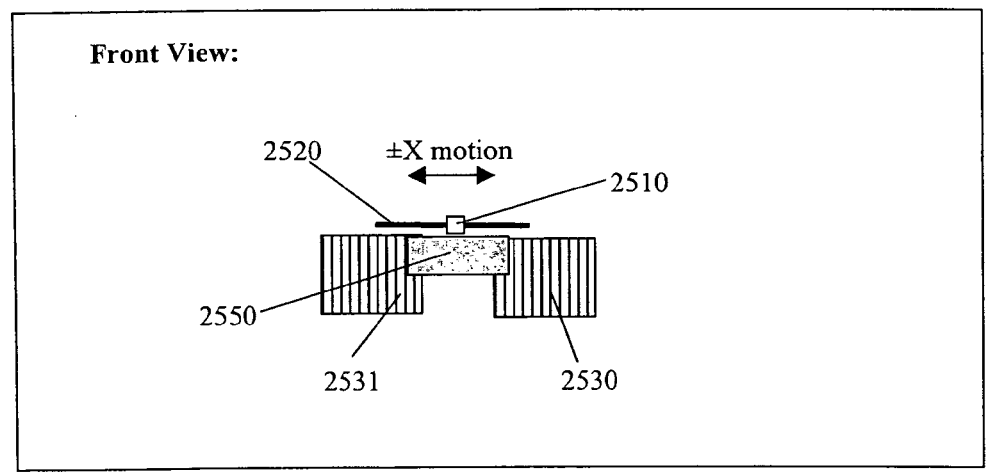

A one degree of freedom latched conduit is shown in FIGS. 25a and 25b, where the latched degree of freedom is in the X Axis direction. The magnets 2530 produce an X direction field in the vicinity of the conductor 2520, thereby producing a force in the ±X direction on the conduit 2510. The latch 2550 is in contact with the conduit 2510. The amount of latching force in the ±X direction is proportional to the area of the contact surface, the pressure exerted between the two surfaces, and the coefficient of friction determined by the nature of the two materials at the contact surface. As is well known when the conduit moving force exceeds the latching force the conduit can move in the ±X direction, otherwise it is latched.

Figure 26A:
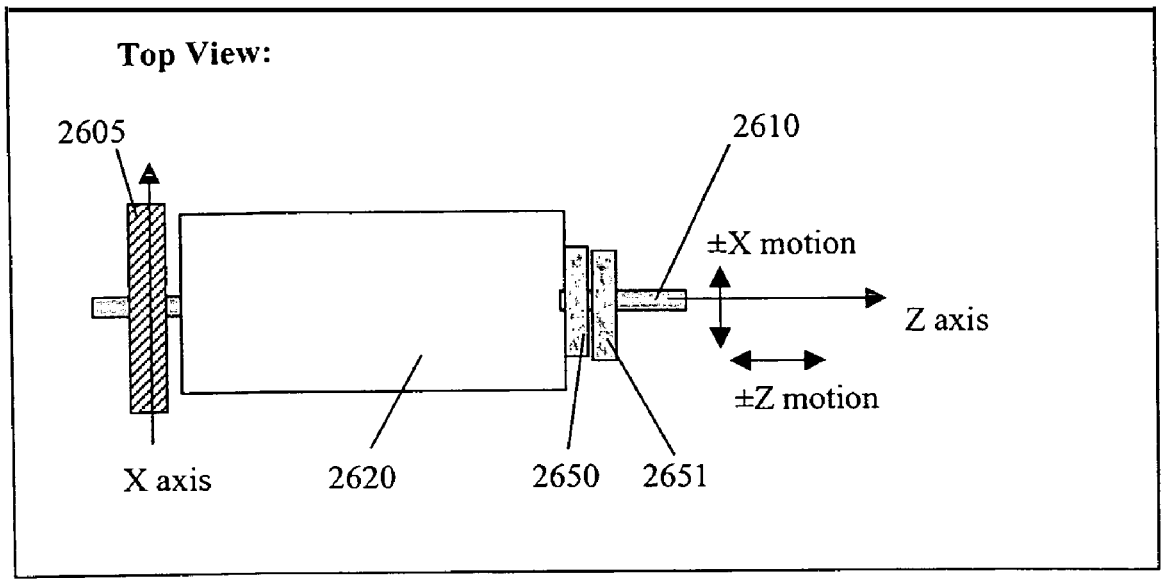
FIGS. 26a and 26b show a top and front view of a two dimensional latched conduit moving device.
Figure 26B:
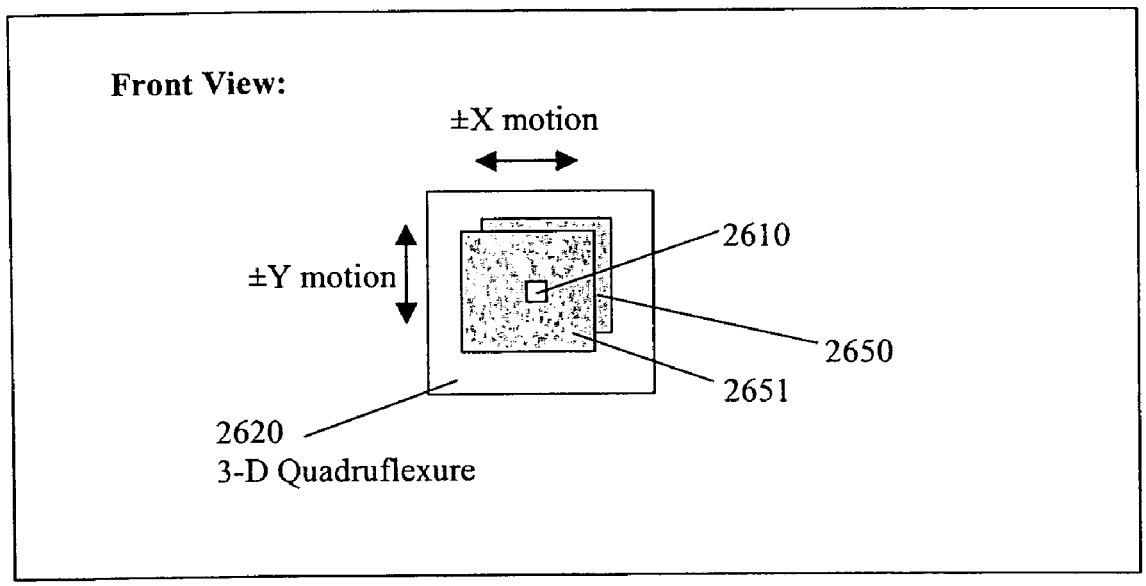

A two degree of freedom latched conduit is shown in FIG. 26, where the latched degrees of freedom include both the X Axis direction and the Y Axis direction. The 3-D quadruflexure embodiment 2620 is capable of translation in the X, Y, and Z directions. The latch comprises two surfaces 2650 and 2651 with surface 2650 attached to the conduit 2620, and surface 2651 attached to the rigid wall 2605. The latch surface 2651 has an opening to allow the conduit to move freely when the latch is not activated. The amount of latching force in the ±X direction and the ±Y direction is proportional to the area of the contact surface, the pressure exerted between the two surfaces 2650 and 2651, and the coefficient of friction. The coefficient of friction is determined by the nature of the two materials at the contact surface of the latch 2650 and 2651. As is well known when the force applied to conduit 2620 exceeds the latching force the conduit can move in the ±X direction or the ±Y direction, otherwise it is latched. In addition, the Z Axis degree of freedom in the conduit 2620, can be used to adjust the pressure exerted between the two latching surfaces 2650 and 2651, thereby adjusting the latching force.

Figure 27A:
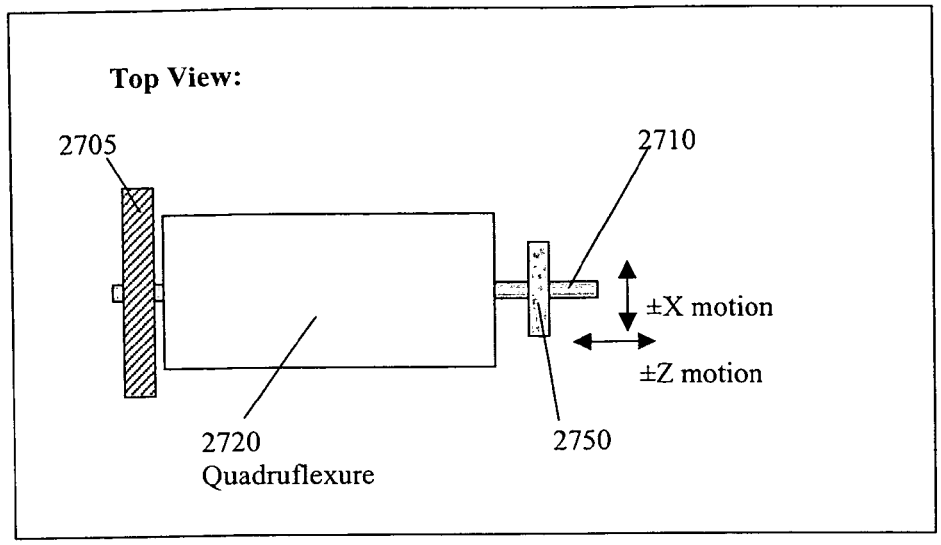
FIGS. 27a and 27b show a top and front view of a latched conduit able to control movement in six degrees of freedom.
Figure 27B:
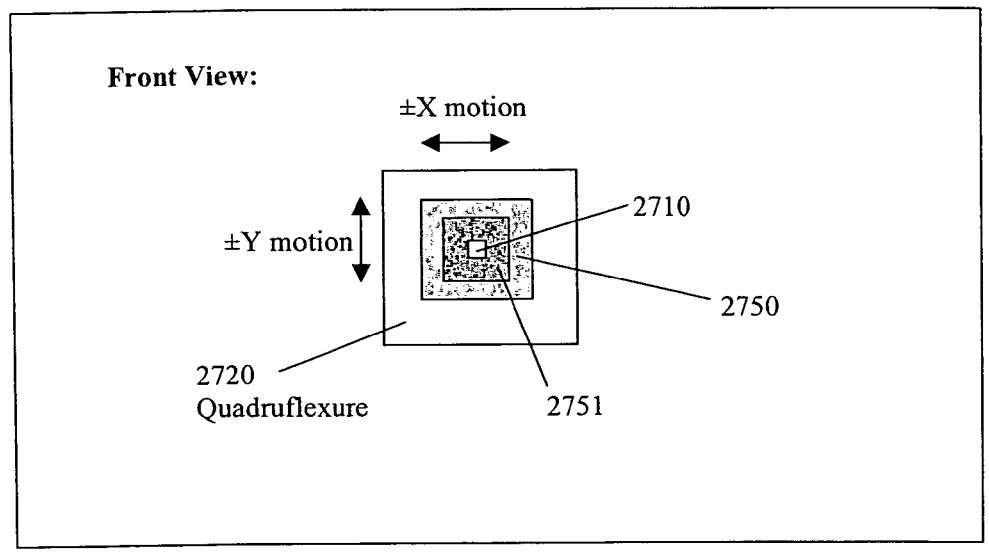

A multiple degree of freedom latched embodiment is shown in FIGS. 27a and 27b, where the latched degree of freedom is in the X Axis direction, the Y Axis direction and the Z axis direction, as well as in the three compound angle directions, θ, ψ, and Φ. The latch 2750 is fixed in position with respect to the rigid wall 2705. The latch 2750 is filled with a latching substance 2751, which is also in contact with the conduit 2710. The latching substance 2751 can be made to change its hardness properties thereby allowing motion of the conduit 2710 by quadruflexure 2720.

For example, the latching substance 2751 could be paraffin. As is well known when paraffin is heated above its melting point of about 50° C. it softens. There are many other suitable materials that change their properties when heat is applied. This heating could be affected by a number of well-known means such as applying a current through the latch 2750, or by direct illumination of the latching substance 2751 by a heating light source. When the latching substance 2751 is soft the conduit can move; when the latching substance is allowed to cool below about 50° C. it hardens and latches the conduit 2710, in place.

Electric Field Embodiments:

The electric field produced by a device similar in volume or size to the previously disclosed embodiments with magnetic fields exerts about one thousand times less force. Nevertheless, there are a number of devices built with well-known MEMS (Miniature Electro-Mechanical Systems) process technologies and other lithographic processes that use electric field forces.

Figure 28A:
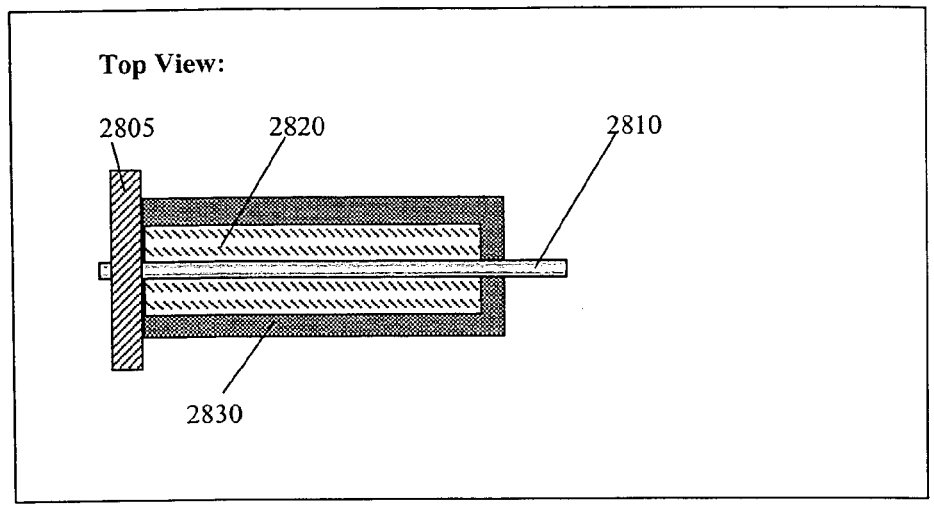
FIGS. 28a and 28b show a top and front view of an electric field based conduit moving device.
Figure 28B:
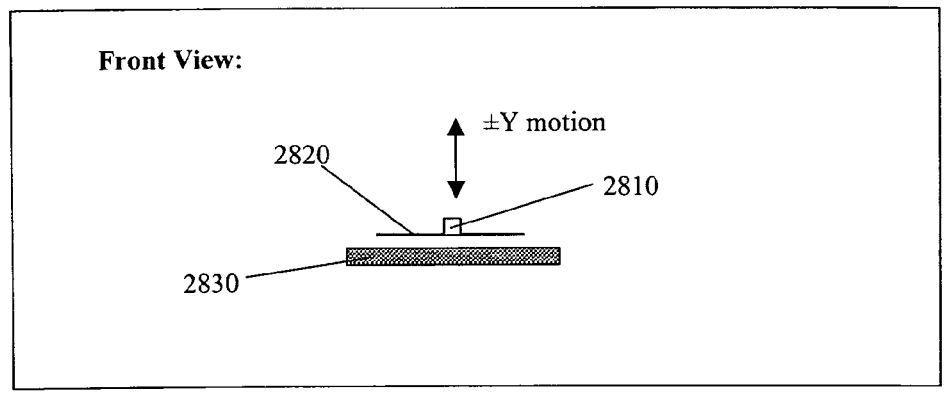

It is possible to fabricate an electric field based embodiment as shown in FIGS. 28a and 28b, using MEMS processes. The flexible conduit 2810 is attached to the flexible top capacitor plate 2820. The bottom capacitor plate 2830 can be rigid and fixed to the rigid wall 2805. When a voltage difference is applied to the two capacitor plates 2820 and 2830, a force is exerted on the top capacitor plate that induces motion in the conduit 2810 in the y direction.

Figure 29A:
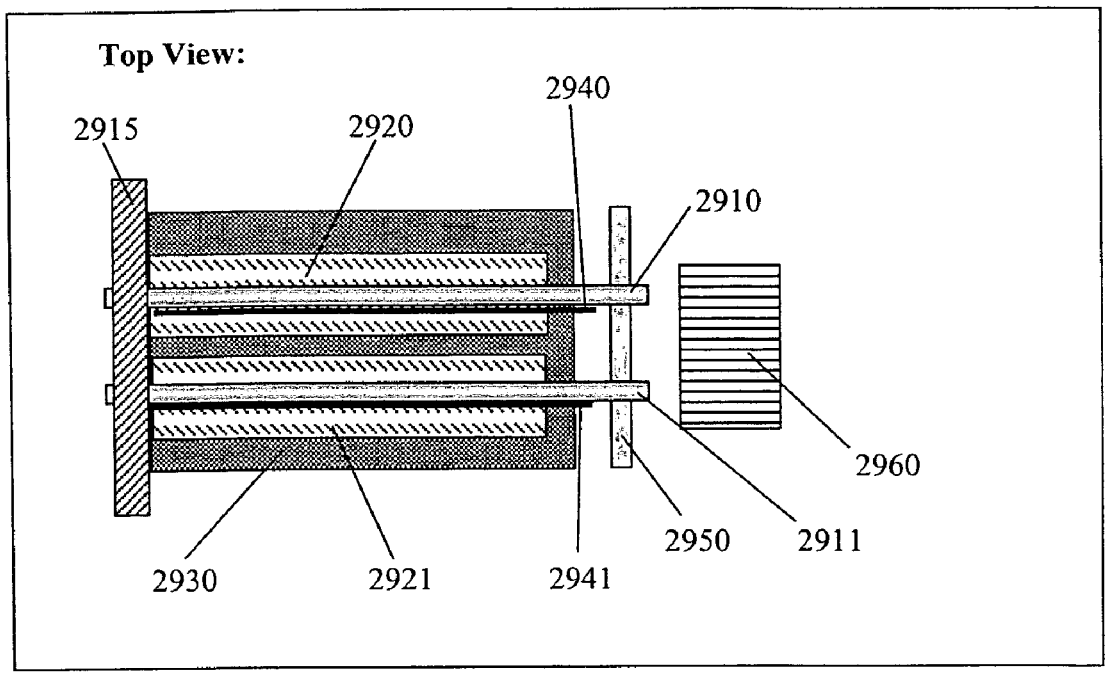
FIGS. 29a and 29b show a top and front view of a latched and bussed two dimensional array of movable conduits.
Figure 29B:
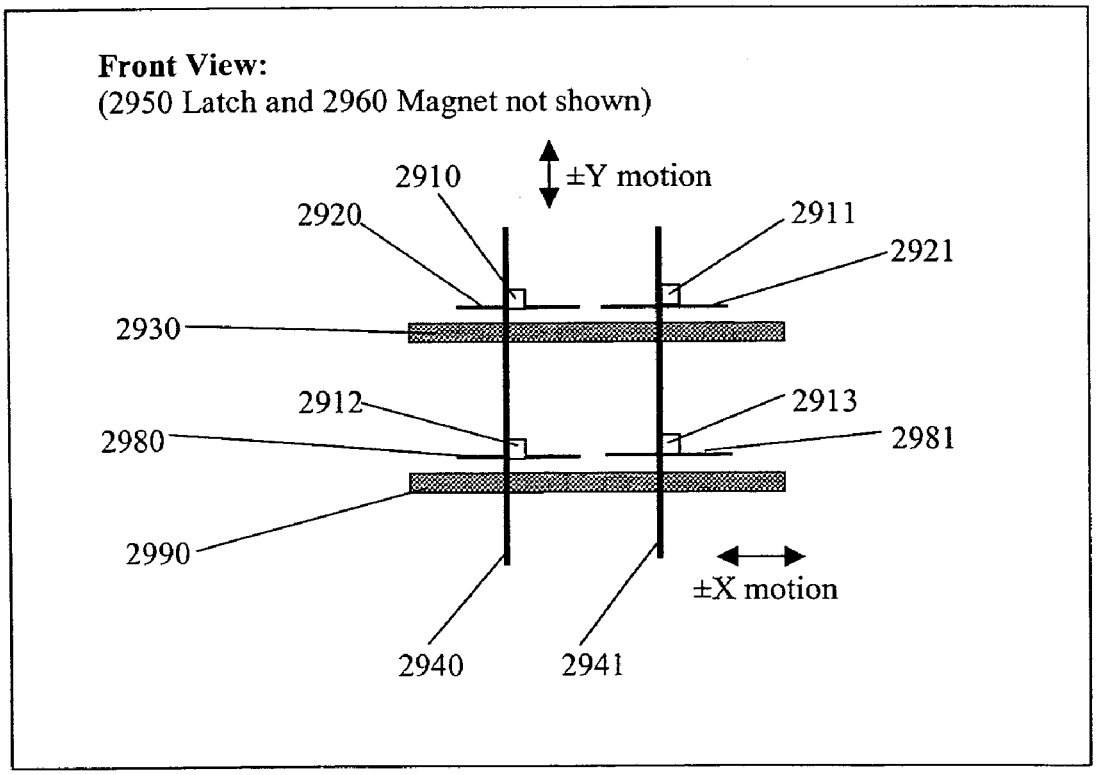

The disadvantage of small force may be offset by the efficiency of the fabrication process. When this electric field based actuator is combined with any of the previously disclosed embodiments the result is a new and potentially useful device. For example, the concept for a bussed and latched device is shown in FIGS. 29a and 29b.

Embodiment for a Bussed and Latched Array:

A bussed structure, as described herein, is one that allows elements of an array to be electrically addressed by their common row and column conductors.

For example, a 2 row by a 2 column array (not depicted in figures) may consist of the four elements: 11, 12, 21, and 22. Row 1 conductor connects elements 11 and 12 in series. Row 2 conductor connects elements 21 and 22 in series. Column 1 conductor connects elements 11 and 21 in series. And column 2 conductor connects elements 12 and 22 in series. In a buss structure only element 11 is electronically addressed by both row 1 and column 1 conductors, only element 12 is electronically addressed by both row 1 and column 2 conductors, etc.

In the above example there is little benefit to the bussed structure because four conductors are required for the bussed configuration, and four conductors are required for the non-bussed configuration (simply addressing each element individually).

However, if the array is larger, for example 10 rows and 5 columns, then only 15 conductors are required for the bussed structure, as compared with 50 conductors to individually address each element in a non-bussed structure. Larger arrays, of course, substantially benefit from the bussed structure even more.

An array embodiment is well suited to take advantage of the bussed and latched principle. FIGS. 29a and 29b show an embodiment for a bussed and latched device. Also of note is the potential for the quadruflexure to be manufactured economically using the MEMS processes and the ability of these devices to maintain their state when power is removed.

The two optical conduits 2910 and 2911 are both latched by the latch 2950, and the latch is activated by the common voltage applied to the two top flexible capacitor plates 2920 and 2921, with the bottom capacitor plate 2930 held fixed by the rigid wall.

Typically, the latching motion is very small in order to reduce the stiction by a large amount. Therefore, the reduced electric field force is not a handicap in this embodiment.

Similarly the two optical conduits 2912 and 2913 are both independently latched from the conduits 2910 and 2911 by another latch (not shown) similar to 2950, and activated by another common voltage applied to both top capacitor plates 2980 and 2981, and bottom capacitor plate 2990.

The row information of the four conduits is defined by the two latch voltages, and the column information of the four conduits is defined by two voltages applied to the Y axis conductors 2940. Motion in the ±X direction can occur for an unlatched conduit induced by the Z axis magnet 2960 in the vicinity of the Y axis conductor 2940.

When the array is in the desired ±X direction position for each conduit, the Z axis magnet 2960, and the power to the conductors 2940 and 2941, and the power to the latch capacitors 2920, 2921, 2930, 2980, 2981, and 2990 may be removed. With power and/or the magnetic field removed the array of conduits will maintain their latched positions.

In the above example for an array of four conduits the benefit of the bussed and latched array is not apparent compared with simply addressing each of the four conduits individually. However, with larger arrays, as mentioned above, the device takes advantage of the bussed and latched configuration to substantially reduce the number of conductors required to address each conduit.

Those of skill in the art will understand from all of the foregoing examples and embodiments that a number of different combinations exist. The conduit moving technology disclosed herein may be sold as a system or incorporated as a component, as may be the position sensor, which may be used in the disclosed system or may be adopted to other conduit or fiber moving systems.

A number of embodiments may be combined in various systems. For example, the use of a cam, as illustrated in FIGS. 2d-2e, is able to exert more force and more accurately hold a position for a longer period of time than some other embodiments. The tradeoff is a less responsive means for moving the conduit than other embodiments. For example, a conduit moving with conductors in an electromagnetic field tends to be less massive and less complex than a cam system. In some embodiments, a cam would be used for z-axis focusing, in which a single conduit z-axis position would be held for a prolonged period of time. More rapid x and y axis movement could then be driven by elongate flexible conductors or capacitors Both the conduit and a conductor and their combinations may have symmetric or asymmetric cross sectional shapes. If an asymmetric cross sectional shape (such as a ribbon shape) is selected, the conduit or conductor will have variable stiffness in varying directions of flexure.

What is claimed is:

1. A device for moving an optical beam comprising:
   a conduit;
   a conductor joined to said conduit and independently movable in relation to the conduit for at least a portion of a length of said conductor;
   a electromagnetic field generator positioned in relation to said conductor such that the conductor is movable by a electromagnetic field generated by said electromagnetic magnetic field generator;
   a shutter affixed to said conduit at a location on said conduit;
   a beam source positioned such that the beam source may direct a beam at said shutter;
   a beam sensor positioned such that said beam is directed at a beam sensing portion of said beam sensor, wherein movement of said conduit causes said shutter to modulate an amount of said beam that reaches the beam sensor; and
   a controller linked to said beam sensor and said conductor such that signals obtained from the beam sensor are sent to the controller and wherein said controller regulates a current flowing through said conductor at least in part in response to said signals from said beam sensor.

2. The device of claim 1, wherein said conduit is selected from a group consisting of an optical fiber, a light pipe, and a photonic crystal fiber.

3. The device of claim 1, wherein said conduit has variable stiffness in different directions of flexure.

4. The device of claim 1, wherein said conductor is composed of more than one loop.

5. The device of claim 1, wherein said conductor includes a plurality of discrete, elongate structures.

6. The device of claim 1, wherein said conductor has variable stiffness in different directions of flexure.

7. The device of claim 1, wherein both said conduit and said conductor have variable stiffness in different directions of flexure.

8. The device of claim 1, wherein the conductor is formed in a quadrupole loop shape.

9. The device of claim 1, wherein the electromagnetic field generator is selected from a group consisting of an electromagnet, a capacitor, and a permanent magnet.

10. The device of claim 1, wherein the conduit and the conductor are attached to a fixed wall structure.

11. The device of claim 1, wherein the conduit, the conductor, and the beam sensors are attached to a fixed wall structure.

12. The device of claim 1, wherein the controller is a servo controller.

13. The device of claim 1, wherein said conductor has an asymmetric cross sectional shape.

14. The device of claim 1, further including a latch positioned such that the latch may contact the conduit.

15. The device of claim 1, wherein said conduit and said conductor are configured such that said conduit is movable at one end in a single degree of freedom.

16. The device of claim 1, wherein said device is configured to allow selectable movement of one end of said conduit in two degrees of freedom and to provide restricted movement in four degrees of freedom.

17. A device for moving light comprising:
   a conduit;
   a means for moving the conduit, said means for moving the conduit configured to apply a force to a side of said conduit, the conduit configured to leave an end of said conduit unattached to any optical elements such that said end emits an uncollimated beam;
   a position sensor which senses a position of a movable portion of the conduit proximate to a conduit location where a motive force is applied; and
   a control configured to control the means for moving the conduit at least partially using signal from the position sensor, wherein said position sensor includes a shutter affixed to said conduit, a positioning beam source, and a signal detector, wherein said shutter may modulate an amount of a positioning beam generated by said positioning beam source that impinges on said signal detector as said conduit is moved.

18. The device of claim 17, wherein said control includes a stiffness control.

19. The device of claim 17, wherein said control includes an accuracy of motion control.

20. The device of claim 17, wherein said control includes a dampening control.

21. The device of claim 17, wherein said means for moving the conduit includes a flexible capacitor.

22. The device of claim 17, wherein said means for moving the conduit includes a piezo electric actuator and a force coupling member.

23. The device of claim 17, wherein said means for moving the conduit includes a means for axially rotating said conduit.

24. The device of claim 17, wherein said means for moving the conduit includes a means for translating an end of the conduit.

25. The device of claim 17, wherein said means for moving the conduit is selected from a group consisting of a cam, a screw, and a micrometer.

26. The device of claim 17, wherein said means for moving the conduit is selected from a group consisting of a motorized cam, a motorized screw, and a motorized micrometer.

27. The device of claim 17, wherein said means for moving the conduit includes a means for moving the conduit with two degrees of freedom and restricting movement in four degrees of freedom.

28. The device of claim 17, wherein said mean for moving the conduit includes a means for moving the conduit in three degrees of freedom and restricting movement in three degrees of freedom.

29. The device of claim 17, wherein said means for moving the conduit includes a means for moving the conduit in four degrees of freedom and restricting movement in two degrees of freedom.

30. The device of claim 17, wherein said means for moving the conduit includes a means for moving the conduit in five degrees of freedom and restricting movement in one degree of freedom.

31. The device of claim 17, wherein said means for moving the conduit includes a means for moving the conduit in six degrees of freedom.

32. The device of claim 17, wherein said means for moving the conduit includes at least one cam attached to said conduit at a first conduit location and at least one elongate, flexible conductor attached to the conduit at a second conduit location.

33. The device of claim 17, wherein said means for moving the conduit includes a magnetic field generating source.

34. The device of claim 17, wherein said means for moving the conduit includes a plurality of conductors attached at a plurality of locations on said conduit, each conductor independently movable in relation to said conduit.

35. The device of claim 17, wherein said conduit is manufactured with a bent shape.

36. A device for moving a light beam comprising:
a light source configured to produce a beam;
a conduit is positioned to transmit said beam;
a conductor attached to said conduit and independently movable for a portion of a conductor length in relation to the conduit;
a rigid mount holding one location of said conduit and two locations of said conductor at fixed positions;
an electromagnetic field generator positioned in relation to said conductor such that said conductor is movable by said magnetic field generator when variable current is introduced through said conductor and a magnetic field is generated by said magnetic field generator;
a position sensor able to detect a position of said conduit; and
a control linked to said position sensor, said control configured to regulate current flow through said conductor at least in part in response to information from said position sensor, wherein said position sensor includes a shutter affixed to said conduit, a positioning beam source, and a signal detector, wherein said shutter may modulate an amount of a positioning beam generated by said positioning beam source that impinges on said signal detector as said conduit is moved.

37. The device of claim 36, wherein said position sensor further includes a reference detector positioned such that said shutter does not modulate positioning beam light that impinges on said reference detector, allowing said reference detector to normalize light output by said positioning beam source.

38. The device of claim 36, wherein said control is a servo control.

39. The device of claim 36, wherein the conduit is positioned at a hemispherical image surface of a fixed lens.

40. The device of claim 36, wherein the conduit is positioned at a Petzval image surface of a fixed lens.

41. The device of claim 39, wherein said servo control includes an amplifier that produces a proportional voltage .

42. The device of claim 39, wherein said servo control includes an integrator that produces an integral voltage.

43. The device of claim 39, wherein said servo control includes a differentiator that produces a differential voltage.

* * * * *